US009588255B1

(12) United States Patent
Tassin et al.

(10) Patent No.: US 9,588,255 B1
(45) Date of Patent: Mar. 7, 2017

(54) DISPERSION MANAGEMENT WITH METAMATERIALS

(71) Applicant: IOWA STATE UNIVERSITY RESEARCH FOUNDATION, INC., Ames, IA (US)

(72) Inventors: Philippe Tassin, Göteborg (SE); Thomas Koschny, Ames, IA (US); Costas M. Soukoulis, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 59 days.

(21) Appl. No.: 14/494,174

(22) Filed: Sep. 23, 2014

Related U.S. Application Data

(60) Provisional application No. 61/881,310, filed on Sep. 23, 2013.

(51) Int. Cl.
*G02B 6/26* (2006.01)
*G02B 1/00* (2006.01)

(52) U.S. Cl.
CPC .............. *G02B 1/007* (2013.01); *G02B 6/26* (2013.01)

(58) Field of Classification Search
CPC ........................... H01S 5/50; H04B 10/25133
See application file for complete search history.

(56) References Cited

U.S. PATENT DOCUMENTS

| 4,861,136 | A | 8/1989 | Stone et al. |
| 6,791,432 | B2 | 9/2004 | Smith et al. |
| 6,904,206 | B2 | 6/2005 | Bao et al. |
| 7,155,087 | B2 | 12/2006 | Suh et al. |
| 7,349,600 | B2 | 3/2008 | Chen |
| 8,054,146 | B2 | 11/2011 | Soukoulis et al. |
| 8,559,770 | B2 | 10/2013 | Donlagic et al. |
| 8,655,123 | B2 | 2/2014 | Donlagic |
| 2008/0129980 | A1 | 6/2008 | Dhawan et al. |
| 2013/0052463 | A1 | 2/2013 | Shelton et al. |
| 2014/0193301 | A1 | 7/2014 | Xiong et al. |
| 2015/0331146 | A1* | 11/2015 | Alisafaee ............... G02B 1/007 359/337.5 |

OTHER PUBLICATIONS

Jain, Aditya, et al., "Large Quality Factor in Sheet Metamaterials Made from Dark Dielectric Meta-atoms", Physical Review Letters, PRL 112, (2014),117403-1-117403-5. Mar. 21, 2014.

Dastmalchi, Babak, et al., "Strong group-velocity dispersion compensation with phase-engineered sheet metamaterials", Physical Review, B 89, (2014), po. 115123-1-115123-4.

(Continued)

*Primary Examiner* — Sung Pak
*Assistant Examiner* — Hoang Tran
(74) *Attorney, Agent, or Firm* — McKee, Voorhees & Sease, PLC

(57) ABSTRACT

An apparatus, system, and method to counteract group velocity dispersion in fibers, or any other propagation of electromagnetic signals at any wavelength (microwave, terahertz, optical, etc.) in any other medium. A dispersion compensation step or device based on dispersion-engineered metamaterials is included and avoids the need of a long section of specialty fiber or the need for Bragg gratings (which have insertion loss).

11 Claims, 14 Drawing Sheets

(56) References Cited

OTHER PUBLICATIONS

Kurter, Cihan, et al., "Classical analogue of Electromagnetically Induced Transparency with a Metal-Superconductor Hybrid Metamaterial", Physical Review Letters, PRL 107, (2011), pp. 043901-1-043901-4.
Tassin, Philippe, et al., "Electromagnetically Induced Transparency and Absorption in Metamaterials: The Radiating Two-Oscillator Model and Its Experimental Confirmation", Physical Review Letters, PRL 109, (2012), pp. 187401-1-187401-5.
Tassin, Phillippe, et al., "Planar designs for electromagnetically induced transparency in metamaterials", Optical Society of America, vol. 17, No. 7, (2009), pp. 5595-5605.
Tassin, P., et al., "Low-Loss Metamaterials Based on Classical Electromagnetically Induced Transparency", Physical Review Letters, PRL 102, 053901 (2009), pp. 053901-1-053901-4.
Ames Laboratory, Iowa State University, "Dispersion Management with EIT metamaterials", May 25, 2012, pp. 1-12.
Dastmalchi, Babak, et al., "Dispersion Compensation Using Metamaterial Based EIT", Ames Laboratory-US DOE and Department of Physics and Astronomy, Iowa State University,pp. 1-4.
Litchinitser, Natalia, et al., "Fiber Bragg Gratings for Dispersion Compensation in Transmission: Theoretical Model and Design Criteria for Nearly Ideal Pulse Recompression", Journal of Lightwave Technology, vol. 15, No. 3, (Aug. 1997), pp. 1303-1313.
Sjostrom, Fredrik, "Fiber Bragg Grating Dispersion Compensation Enables Cost-Efficient Submarine Optical Transport", Photonics Online, (2009), 12 pages.
Abramczyk, Halina, "Dispersion phenomena in optical fibers", Technical University of Lodz, 28 pages.
Soukoullis, Costas, et al., "Past achievements and future challenges in the development of three-dimensional photonic metamaterials", Nature Photonics, (2011), DOI:1038, pp. 1-8.

\* cited by examiner

DISPERSION MANAGEMENT WITH METAMATERIALS

CROSS-REFERENCE TO RELATED APPLICATIONS

This application claims priority under 35 U.S.C. §119 to provisional application Ser. No. 61/881,310 filed Sep. 23, 2013, herein incorporated by reference in its entirety.

GRANT REFERENCE

This invention was made with government support under Grant No. DE-AC02-07CH11358 awarded by the Department of Energy and Grant No. DOD N00014-10-1-0925 awarded by the Office of Navy Research. The government has certain rights in the invention.

I. BACKGROUND OF THE INVENTION

A. Field of the Invention

The present invention relates to manipulating pulses of electromagnetic energy transmitted in a dispersive medium (e.g., waveguides, free space, etc.) having a dispersive characteristic and, in particular, to apparatus, systems, and methods of compensating for the dispersion. One relevant application is dispersion management or compensation in fiber optics in communications systems but the present invention is not so limited.

B. Problems in the State of the Art

Dispersion management is an indispensable element of optical communication systems, where dispersive effects—originating from the materials, waveguide (fiber) geometries, and optical amplification—accumulate to set limits on both the distance and the bit rate of the data transfer. Various compensation schemes have been developed to manage group velocity dispersive effects (see, for example, [1] G. P. Agrawal, *Fiber-Optic Communication Systems*, Wiley Series in Microwave and Optical Engineering (Wiley, New York, 2010); and [2] S. Ramachandran, *Fiber Based Dispersion Compensation*, Optical and Fiber Communications Reports Vol. 5 (Springer, New York, 2007)), but fundamental limits on integrability, footprint, and customizability are imposed by the physics in contemporary dispersion management systems. Although not necessarily apparent to one skilled in the art without having the benefit of this disclosure, recent advances in nanofabrication and breakthroughs in the field of metamaterials have opened up a new range of possibilities in device development. See, for example, [3] D. R. Smith, J. B. Pendry, and M. C. K. Wiltshire, Science 305, 788 (2004); [4] R. Engheta and R. W. Ziolkowski, *Metamaterials, Physics and Engineering Explorations* (Wiley-IEEE, New York, 2006); [5] V. M. Shalaev, Nat. Photon. 1, 41(2007); [6] Y. Liu and X. Zhang, Chem. Soc. Rev. 40, 2494 (2011); [7] C. M. Soukoulis and M. Wegener, Nat. Photon. 5, 523 (2011); [8] N. I. Zheludev and Y. S. Kivshar, Nat. Mater. 11, 917 (2012); all incorporated by reference herein.

Most metamaterials rely on highly resonant structures that force light to undergo a large phase change near resonance frequencies. This results in strong dispersion in a narrow spectral range, making them suitable for dispersion management purposes. Indeed, it was recently shown that light passing through a so-called metasurface experiences up to a $2\pi$ phase shift upon transmission/reflection in a system that is much thinner than the free-space wavelength of the incident light, mimicking a phase discontinuity. See, for example, [9] N. Yu, P. Genevet, M. A. Kats, F. Aieta, J.-P. Tetienne, F. Capasso, and Z. Gaburro, Science 334, 333 (2011); [10] F. Aieta, P. Genevet, M. a. Kats, N. Yu, R. Blanchard, Z. Gaburro, and F. Capasso, Nano Lett. 12, 4932 (2012); both incorporated by reference herein. Phase properties in such metasurfaces are shown to be easily tailorable, although it is important to note that this comes at the cost of absorption in the dispersive region. See, for example, B. Dastmalchi, P. Tassin, T. Koschny, and C. M. Soukoulis, Strong group-velocity dispersion compensation with phase-engineered sheet metamaterials, PHYSICAL REVIEW B 89, 115123 (2014), incorporated by reference herein.

Thus, as can be appreciated by those skilled in the art, a number of factors come into play regarding solutions for this type of dispersion. As can be appreciated by the discussion earlier, dispersion shifted fibers literally require specific long (e.g. kilometer (km) scale), spliced lengths added along the transmission path. Therefore, if a primary concern is the space occupied by the compensating device, they are counter-indicated as a solution. Their form factors are large. On the other hand, if size is not the primary concern and bandwidth is, dispersion shifted fibers can support very broad bandwidth.

Over and above signal loss, Bragg gratings must be manufactured to quite exacting standards. Therefore, unless the system does not have to meet severely exacting fabrication tolerances, Bragg gratings might be counter-indicated as a solution.

The above-discussed considerations or factors, as well as others, must be balanced. They can be antagonistic relative to one another. For example, an ideal dispersion compensation device might have the following types of characteristics: (a) large negative dispersion coefficient, (b) low attenuation, (c) minimal nonlinear contributions, (d) wide bandwidth, (e) also corrects dispersion slope, (f) causes minimal ripple, (g) is polarization independent, (h) has a size and form factor much smaller than the optical fiber it is compensating, (i) is adaptable to a relatively wide variety of applications, and (j) is relatively efficiently and economically manufacturable. Another factor is absorption. Some materials have higher absorption rates than others. Some materials cannot support strong dispersion in highly localized volumes of space. Thus, there are both operational and practical considerations.

Therefore, room for improvement exists in the technical field of optical fiber communications. Improvement to the dispersion problem may be applied in other applications and contexts. The invention may possibly be applied beyond fiber optic transmissions, at least in applications at sufficiently high frequencies where it makes practical sense. This can include but is not limited to wires (e.g. in high speed electronics and electronics interconnects), transmission lines, microwave transmission, and perhaps even free space transmissions.

II. SUMMARY OF THE INVENTION

A. Objects of the Invention

It is therefore a principal object, feature, aspect, or advantage of the present invention to improve over or solve problems and deficiencies in the state of the art.

Other objects, features, aspects, or advantages of the present invention relate to methods and apparatus which insert a metamaterial along a dispersive medium, where the metamaterial is engineered to compensate or manage group wave velocity dispersion.

Further objects, features, aspects, or advantages of the present invention include methods or apparatus for dispersion management as discussed above which:
a. avoid the use of long specialty fibers along the transmission line;
b. avoid the use of Bragg filters along the transmission line;
c. allows balancing of factors related to dispersion compensation including but not limited to bandwidth, size, strength of dispersion, fabrication tolerances, losses, and absorption;
d. is economical;
e. is efficient;
f. allows substantial flexibility in design both for communications and other applications;
g. can be built for a wide range of frequencies;
h. can provide high dispersion in a small volume;
i. can provide strong dispersion at a frequency where absorption is minimized and transmission is maximized, with reasonable loss;
j. is tunable or adaptable to different dispersion compensation needs and different transmission media and signal;
k. can be implemented in different ways to achieve different results relative to balancing of relevant factors.

B. Aspects of the Invention

In one aspect of the invention, a method of strong group-velocity dispersion compensation comprises modifying transmitted electromagnetic (EM) energy with metamaterial that is engineered to have strong dispersion of opposite sign in a spectral range of interest. The metamaterial can include highly resonant structures, which force the incident EM energy to undergo large phase change near resonant frequencies. Phase properties, and thus dispersion compensation, is easily tailorable. Additionally, losses which otherwise might be caused by absorption can be addressed through design and implementation of the metamaterial.

In another aspect of the invention, the metamaterial design models electromagnetically induced transparency (EIT). In one embodiment, the modeling shapes the received pulses to restore pulses back to closer to their original shape. The EIT models a coupled system of resonators (a bright mode and a dark mode). The bright mode couples to the external field and has a low quality factor; the dark mode does not couple directly to the external field and has a very high quality factor; bright and dark mode are weakly coupled by a third interaction independent of the external field. One specific implementation is metamaterial comprised of a two-dimensional array (periodic or not) of sets of coupled interacting resonators that asymmetrically couple to a mode in an optical fiber. Plural two-dimensional arrays can be serially aligned along the path of propagation of the optical pulses.

A device according to the invention comprises a metamaterial of artificial structures smaller than the wavelength of the electromagnetic pulses at issue. In one form those small artificial structures emulate or are an analog to electromagnetically induced transparency (EIT)—a coupled system of resonances including a bright mode and a dark mode. The bright mode easily couples to the external field with a low quality factor while the dark mode does not directly couple to the external field and has a very high quality factor. In one specific envisioned implementation, a two-dimensional current sheet model uses two coupled interacting resonators that asymmetrically couple to the mode in the fiber.

In one form, the device utilizes two coupled resonators at nearly the same resonance frequency but differing in coupling strength to the incident field. In a small wavelength range, energy can be coupled into the dark mode (i.e. EM energy is trapped) resulting in strong dispersion.

The invention can provide for a novel method to counteract group velocity dispersion in fibers (or any other propagation of electromagnetic signals at any wavelength (microwave, terahertz, optical, etc.)). The method involves a dispersion compensation device based on dispersion-engineered metamaterials and avoids the need of a long section of specialty fiber or the need for Bragg gratings (which have insertion loss).

One such class of metamaterials is denoted by EIT (electromagnetically induced transparency) metamaterial. Metamaterials are artificial, engineered structures that contain small electromagnetic resonators (small electrical circuits) that replace atoms in normal materials. EIT metamaterials have strongly modified dispersion (required for dispersion management) and simultaneous high transmission (to keep signal power loss reasonable). In one embodiment, the metamaterial comprises a number of sheets (substrates) with electric and magnetic resonators on it. Beneficial results can be found if the electric and magnetic responses are equal. Each response system (electric and magnetic) contains two coupled resonators at nearly the same resonance frequency, but differing in the coupling strength to the incident electromagnetic field. In a small wavelength range, energy can be coupled into the dark mode (i.e., electromagnetic energy is trapped). This results in the strong dispersion.

These and other objects, aspects, features, or advantages of the invention will become more apparent with reference to the accompanying specification, including claims. No single embodiment need meet each and every object, aspect, feature, or advantage as different embodiments may have different objects, aspects, features, or advantages.

III. BRIEF DESCRIPTION OF DRAWINGS

FIGS. 2A-D are graphs and illustrations related to the discussion of a Second Example of the invention applied to optical fibers.

FIGS. 3A-F are graphs and illustrations related to the discussion of a Third Example.

IV. DETAILED DESCRIPTION OF EXEMPLARY EMBODIMENTS

A. Overview

For a better understanding of the invention, examples of some forms and concepts it can take will now be set forth in detail. It is to be understood that these examples are neither inclusive nor exclusive of the forms the invention can take, but are illustrative only. Variations obvious to those skilled in the art are included within the invention. In addition, all references cited herein are hereby incorporated by reference.

For purposes of explanation, the Examples will be described in the context of dispersion compensation for communications optical fibers such as are used in internet and other telecommunications applications. However, as indicated elsewhere, the invention can be applied in analogous ways to other transmitted EM energy.

Additionally, several examples of how the dispersion compensation components are installed in the transmission path are given, including examples of the types of metamaterial form factors (including different meta atom configurations). However, the invention is not necessarily limited to those examples.

B. Example 1

At a generalized level, the invention avoids long sections of specialty fiber or Bragg filters by inserting a different device at an end of or along a long section of conventional optical fiber. The device comprises a metamaterial engineered to manage or compensate for group velocity dispersion.

Figure 1A:
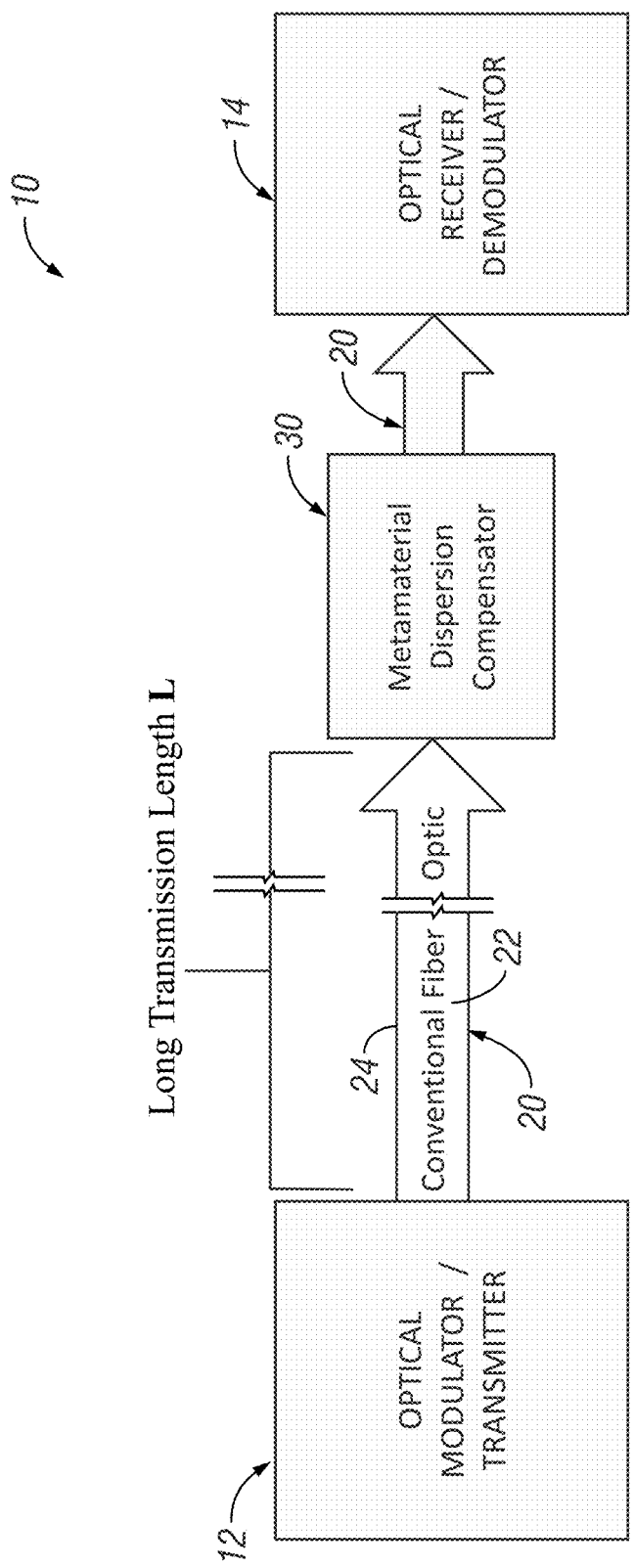
FIG. 1A is a high level diagram of a first example of exemplary embodiment of the present invention applied to an optical fiber communications system.

FIG. 1A is a high level illustration of one embodiment. A metamaterial assembly (indicated generally at reference number 30) is operatively connected to the conventional fiber optic 20 (typically a silica or plastic fiber core 22 of micrometer scale diameter—micrometers to a few tens of micrometers, and a surrounding cladding 24). Other typical features (e.g. buffer and jacket) are omitted for simplicity and are well-known. It is to be understood it could be at the downstream end of conventional fiber optic 20 (relative to direction of EM pulse propagation), at some intermediate position (as indicated in FIG. 1A), or even at or towards the upstream end.

The metamaterial component 20 would basically be the dispersion compensator, for example, the fiber optic system 10 of FIG. 1A. System 10, as is typical, would include a transmitter 12 to introduce the optical pulses into fiber 20 and a receiver 14. Transmitter 12 converts an electrical signal into an optical signal (e.g. by LEDs or laser diodes) comprising an EM carrier wavelength on which are modulated a series of pulses which contain digital information. Receiver 14 (e.g. a photo detector) converts the optical information back to an electrical signal and, particularly, decodes the digital information out of the received optical pulse trains. Other typical components of system 10 are omitted for simplicity and are well-known in the art. The length L of fiber 20 typically can be substantial (kilometer scale—kilometers to tens of kilometers). Many optical fibers 20 can sometimes be bundled in a single cable.

Metamaterial dispersion compensator 30 is configured such that it introduces dispersion of essentially the opposite sign or the negative of the dispersion that will be caused by the conventional length L of fiber optic 20. Therefore, whether at the end, at the beginning, or somewhere in the middle, by appropriate design of metamaterial in compensator 30, appropriate and sufficient compensation for dispersion can be achieved.

Conceptually, in this embodiment, metamaterial in compensator 30 is engineered to be analogous to electromagnetically induced transparency (EIT). This introduces strong dispersion into the signal fiber in a manner that restores the ability to extract information from the signal accurately.

Figure 2A:
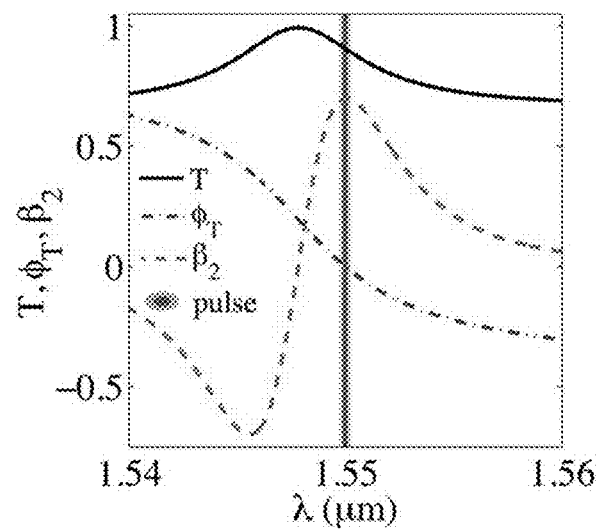
Figure 2B:
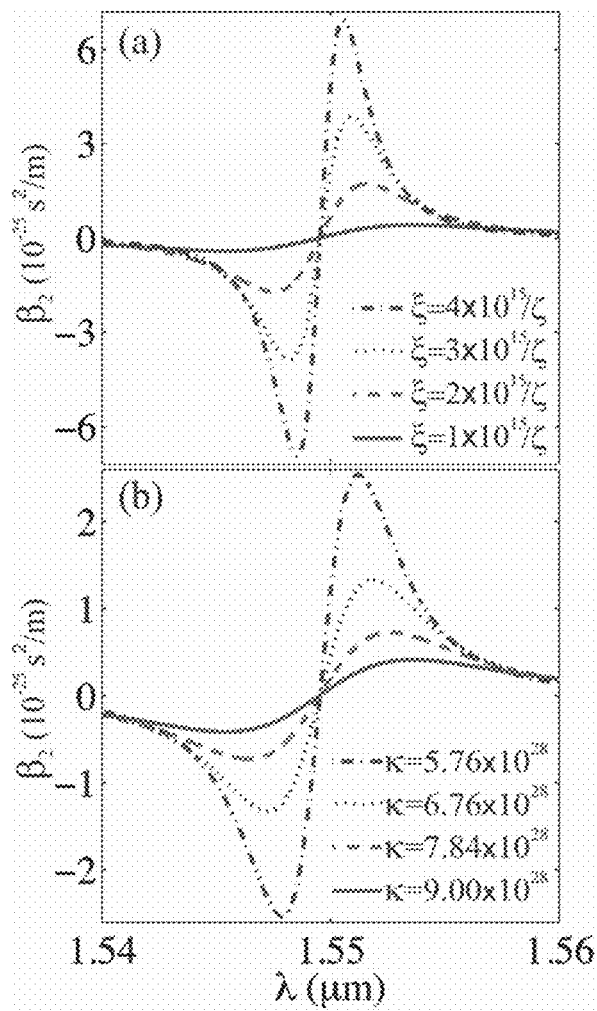
Figure 2C:
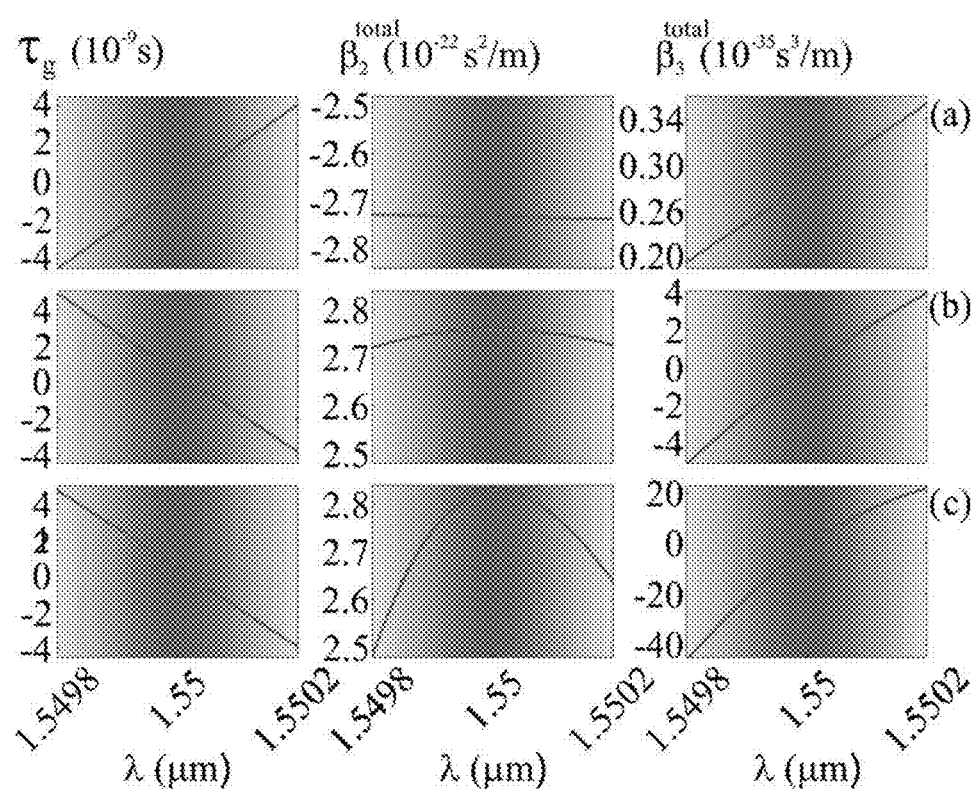
Figure 2D:
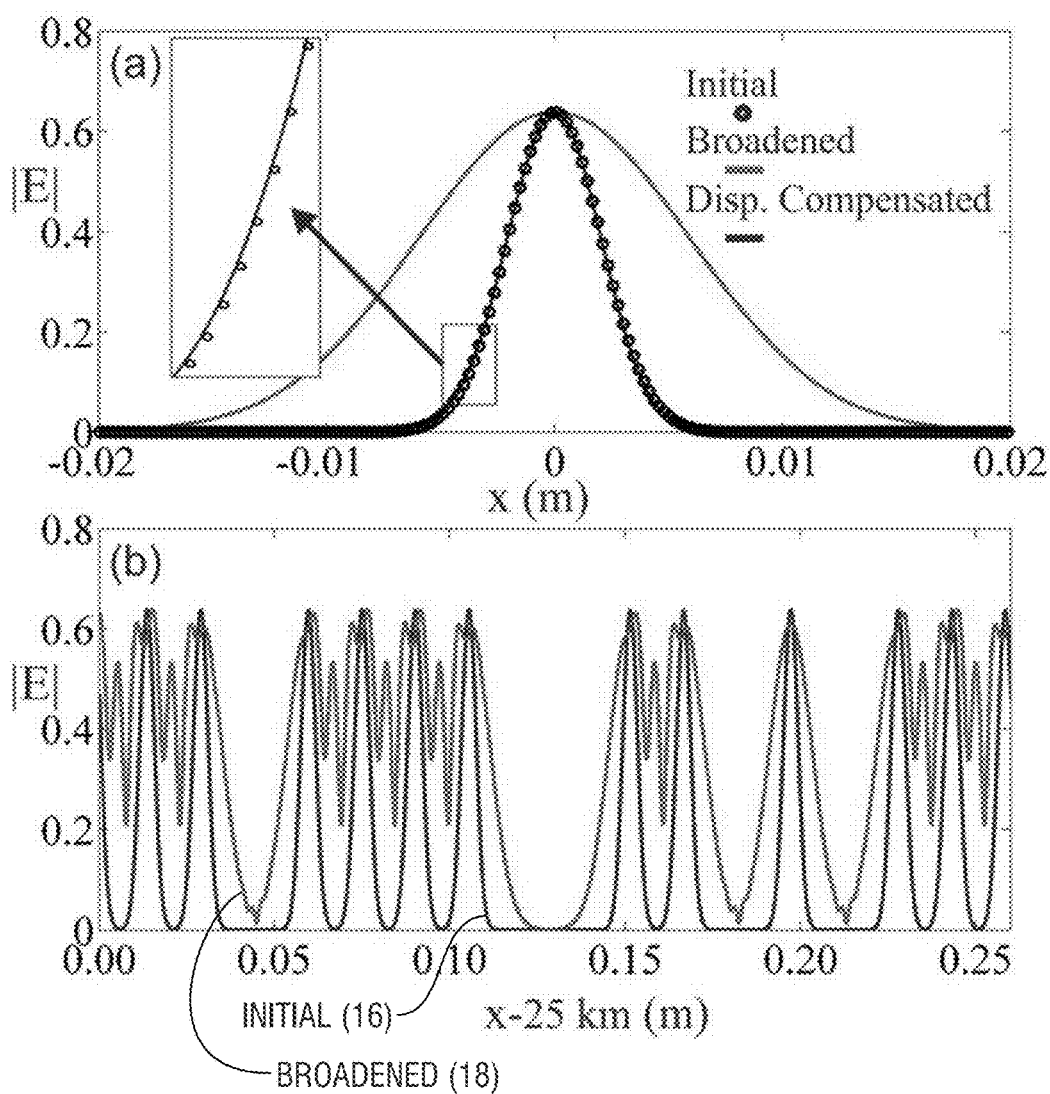

As illustrated in FIG. 2D, the goal of compensator 30 is to essentially restore any dispersion broadened pulse over a long distance (km scale) to a form more like the initial pulse so that it can be accurately detected and decoded at receiver 14. FIG. 2D (bottom graph) superposes representations of an original pulse train (and corresponding intended digital "0" or "1" values for each pulse of train) and a dispersion distorted signal. The non-compensated signal is heavily distorted due to second order dispersion of the fiber (group velocity dispersion). This illustrates the risk of erroneous decoding. FIG. 2D (top graph) illustrates how appropriately engineering metamaterial can almost perfectly restore each pulse.

Metamaterial dispersion compensator 30 can take different forms. One example is a metal resonator on a substrate. Another is by forming inside the fiber geometry using a Fabry-Perot cavity of a mode with angular momentum (not the fundamental mode) as the dark mode. An example of a method of forming a Fabry-Perot cavity inline an optical fiber is described at U.S. Pat. No. 4,861,136 to Stone, et al., incorporated by reference herein. See also, U.S. Pat. No. 6,904,206 to Bao, et al., and U.S. Pat. No. 8,559,770 to Donlagic et al., incorporated by reference herein.

Figure 1B:
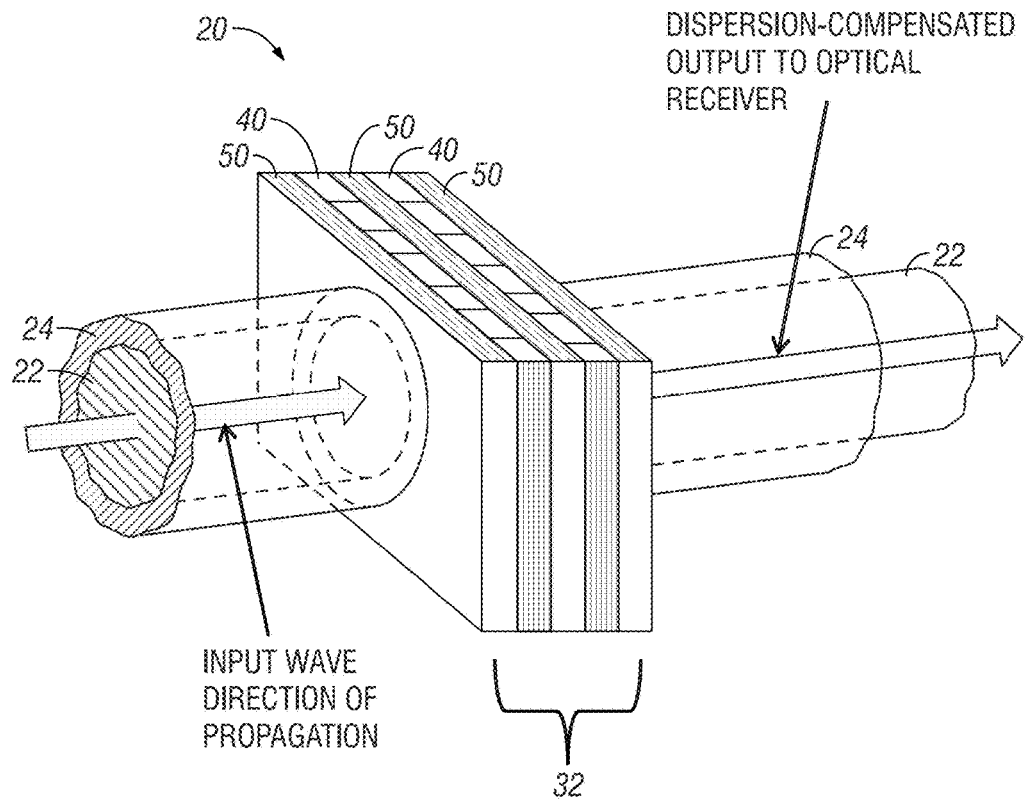
FIG. 1B is a simplified greatly enlarged diagrammatic illustration of one embodiment of metamaterial, inserted along the propagation path, as the dispersion compensator of FIG. 1A.

FIG. 1B diagrammatically illustrates an example of one or more planar sheets inserted in the propagation path (e.g. in optical fibers defined by core 22 of fiber 20). FIG. 1B shows plural sheets 40 serially aligned along the direction of propagation. Each metamaterial sheet 40 is separated by a spacing layer 50. The EM wave would enter the upstream side 34 of the combination of metamaterial and spacer layers 40 and 50. The metamaterial layers would operate on the wave. A dispersion-compensated wave would exit the downstream side 36 of compensator 30. As will be described in more detail below, while dispersion compensation is possible with just one metamaterial sheet 40, there can be advantages to use of plural sheets 30. As is appreciated by those skilled in the art, this (including spacer layers 50) would occupy or introduce some additional space along length L of fiber 20, but can be of micrometer length scale. In some instances, hundreds if not thousands of sheets 40 and spacers 50 might be used. However, using known micro- and nano-fabrication techniques, and the microscale/nanoscale size of needed features of what are sometimes called the meta atoms of the metamaterial sheets, the area (length by width) of each sheet 40 needed to cover the cross-sectional area of core 22 of fiber 20 is on the micrometer scale. It does not need to substantially expand the overall diameter of fiber 20. Each sheet 40 can basically be positioned orthogonally across fiber core 22 and orthogonal to the direction of propagation of the signal. And the thickness of each sheet 40 (including any engineering elements on one or both of its opposite faces 44 and 46) can be on the micro- or even nano-scale (as can be the thickness of any spacer 50). Therefore if metamaterial compensator 30 was a separate insert along length L of fiber 20, it would not add substantially to that length. For example, hundreds of alternating micro-scale thickness layers 40 and 50 would only add to length L on the millimeter scale. And even thousands or tens of thousands of layers would only add on a meter-scale, not a kilometer scale. But, as will be discussed below, it is possible to insert the sheets and spacers in-line to length L of fiber 20, which would not add to that length L (essentially metamaterial compensator 30 would replace a portion of length L of fiber 20). The form factor of metamaterial sheets 40 and their spacing could be on the same general order as the size and spacing (period) between each of the periodically varying refractive index sections of a Bragg grating written into optical fibers according to the dispersion compensation techniques discussed earlier. Typically such gratings are a few millimeters long and within the diameter of the fiber core.

In one example, each metamaterial sheet 40 would include plural artificial resonator circuits, each smaller than the wavelength of the light to be passed through fiber 20. Each circuit can be designed to act like a strongly dispersive "meta atom" to reverse or compensate for dispersion through the dispersive medium (e.g. fiber 20).

The metamaterial of compensator 20 can have these characteristics:
1. One or more layers (substrates) of periodic (identical matrix) structural elements of sub-wavelength size factor (smaller on average than the wavelengths of light they affect).
2. Can be 2D or 3D.
3. Each structural element is artificial, manufactured simulation of atom and affects EM waves (modify velocity of light) by its structural features smaller than the critical wavelength(s).
4. The resonator-like structures essentially:
    a. Are an analog or model Electromagnetically Induced Transparency (EIT) or Fano resonance (see, e.g., U.S. Pat. No. 7,155,087, incorporated by reference herein).
    b. In the sense of a coupled system of resonators including
        i. a bright mode which easily couples to the external field with a low quality factor and
        ii. a dark mode which does not directly couple to the external field and has a very high quality factor.

In one example, those structural features are essentially split-ring resonator structures (when EM waves pass through, create induced I generated field perpendicular to magnetic field of light).

The specific configuration and type of meta atom can vary. A few examples are disclosed in the following, which are attached as Appendices to the provisional patent application upon which this is based (U.S. Ser. No. 61/881,310 filed Sep. 23, 2013), all of which are incorporated by reference herein:
  Appendix D: Dastmalchi, B., Tas sin, P., Koschny, T., and Soukoulis, C., Dispersion Compensation Using Metamaterial Based EIT.
  Appendix E: Dispersion Management with EIT metameterials, Ames Laboratory,
  Appendix F: Tassin, P, L Zhang, L, Koschny, Th., Economou, E. N., Soukoulis, C. M., Low-Loss Metamaterial Based on Classical Electromagnetically Induced Transparency, PRL (Physical Review Letters) 102, 053901 (2009) week ending 6 Feb. 2009, The American Physical Society.
  Appendix G: Tassin, Zhang, Koschny, Economou, Soukoulis, Planar designs for electromagnetically induced transparency in metamaterials, Optics Express, 17, 7, 30 Mar. 2009, 55955605
  Appendix H: Tassin, Zhang, Zhao, Jain, Koschny, Soukoulis, Electromagnetically Induced Transparency and Absorption in Metamaterials: The Radiating Two-Oscillator Model and Its experimental Confirmation, PRL 109, 187401 (2012) week ending 2 Nov. 2012. 1-5
  Appendix I: Kurter, Tassin, Zhang, Koschny, Zhuravel, Ustinov, Anlage, Soukoulis, Classical Analogue of Electromagnetically Induced Transparency with a Metal-Superconductor Hybrid Metamaterial, PRL 107, 043901 (2011) week ending 22 Jul. 2011 1-4 plus supplemental materials (2 pages).
Several additional examples are as follows:
  U.S. Pat. No. 8,054,146, entitled "Structures with Negative Index of Refraction" issued Nov. 8, 2011 to inventors Soukoulis, et al., (incorporated by reference herein).
  Soukoulis, C. M. and Wegner, M., "Past achievements and future challenges in the development of three-dimensional photonic metamaterials", Nature Photon. 5, 253 (2011) and the references cited therein, all incorporated by reference herein.

Figure 1C:
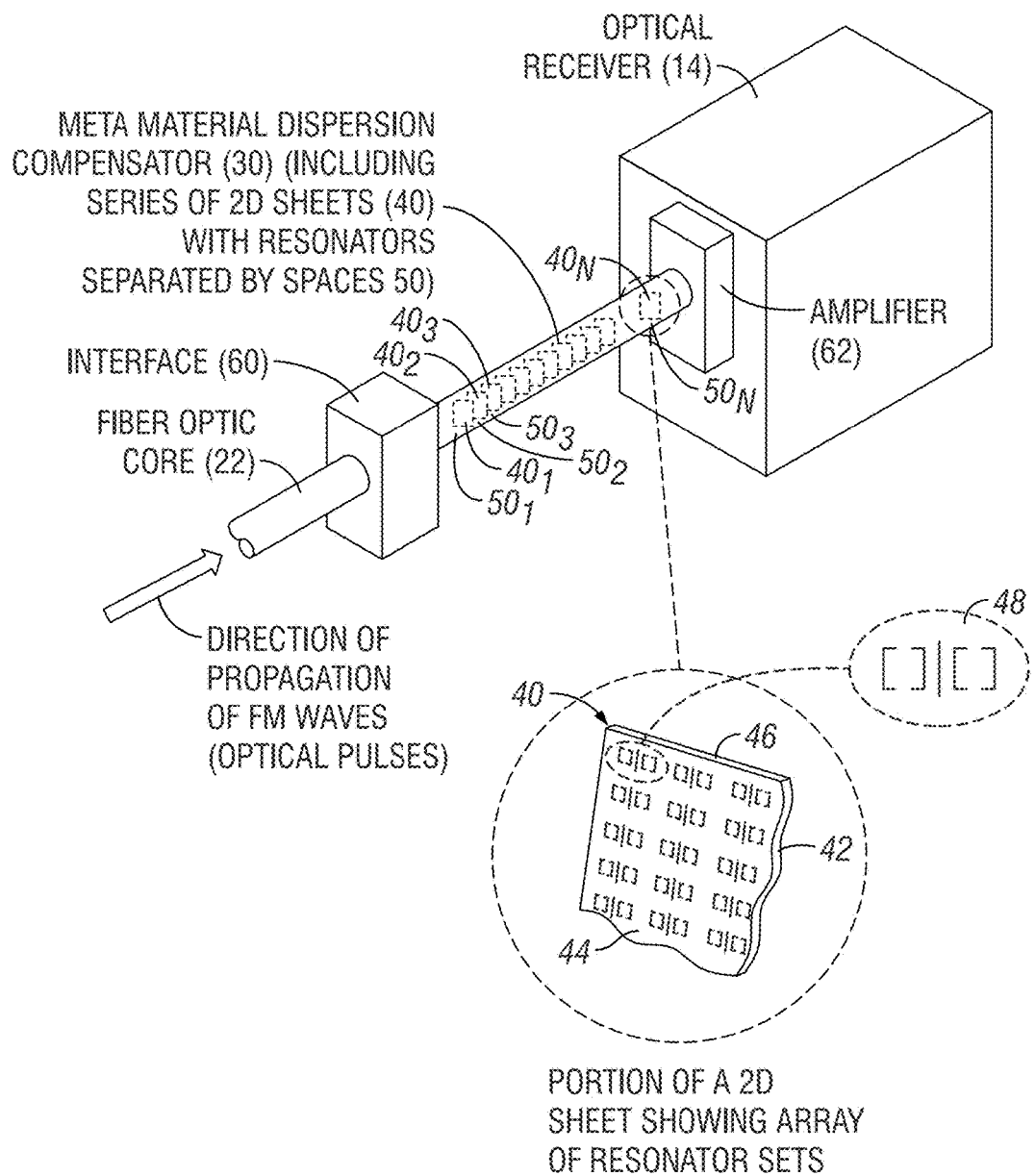
FIG. 1C is a simplified diagram illustrating an embodiment of the in-line dispersion compensator of FIG. 1D, with a series of metamaterial sheets, inserted inline an optical fiber in a fiber-optic communications system such as FIG. 1A.
Figure 1D:
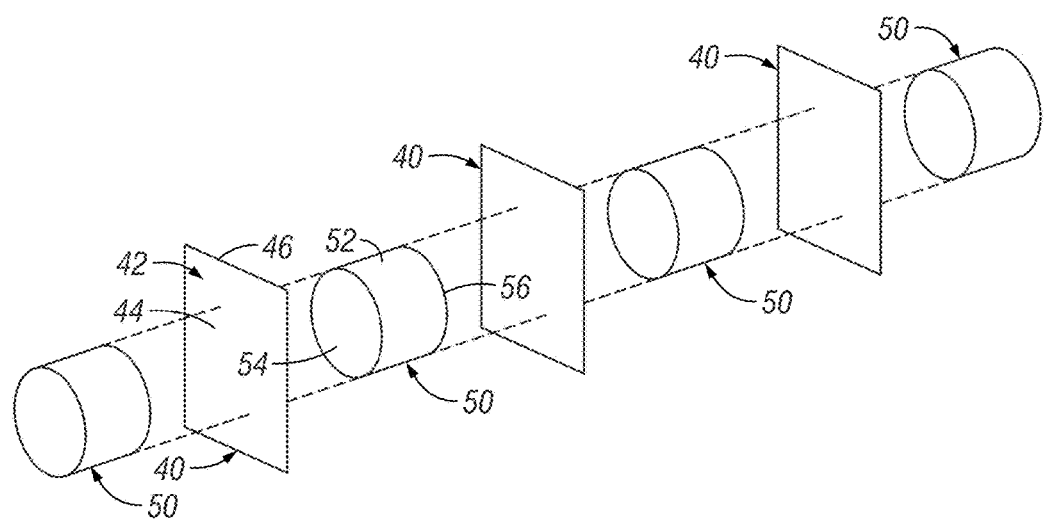
FIG. 1D is an enlarged exploded isolated view of the metamaterial sheets and spaces of FIG. 1C.
Figure 1E:
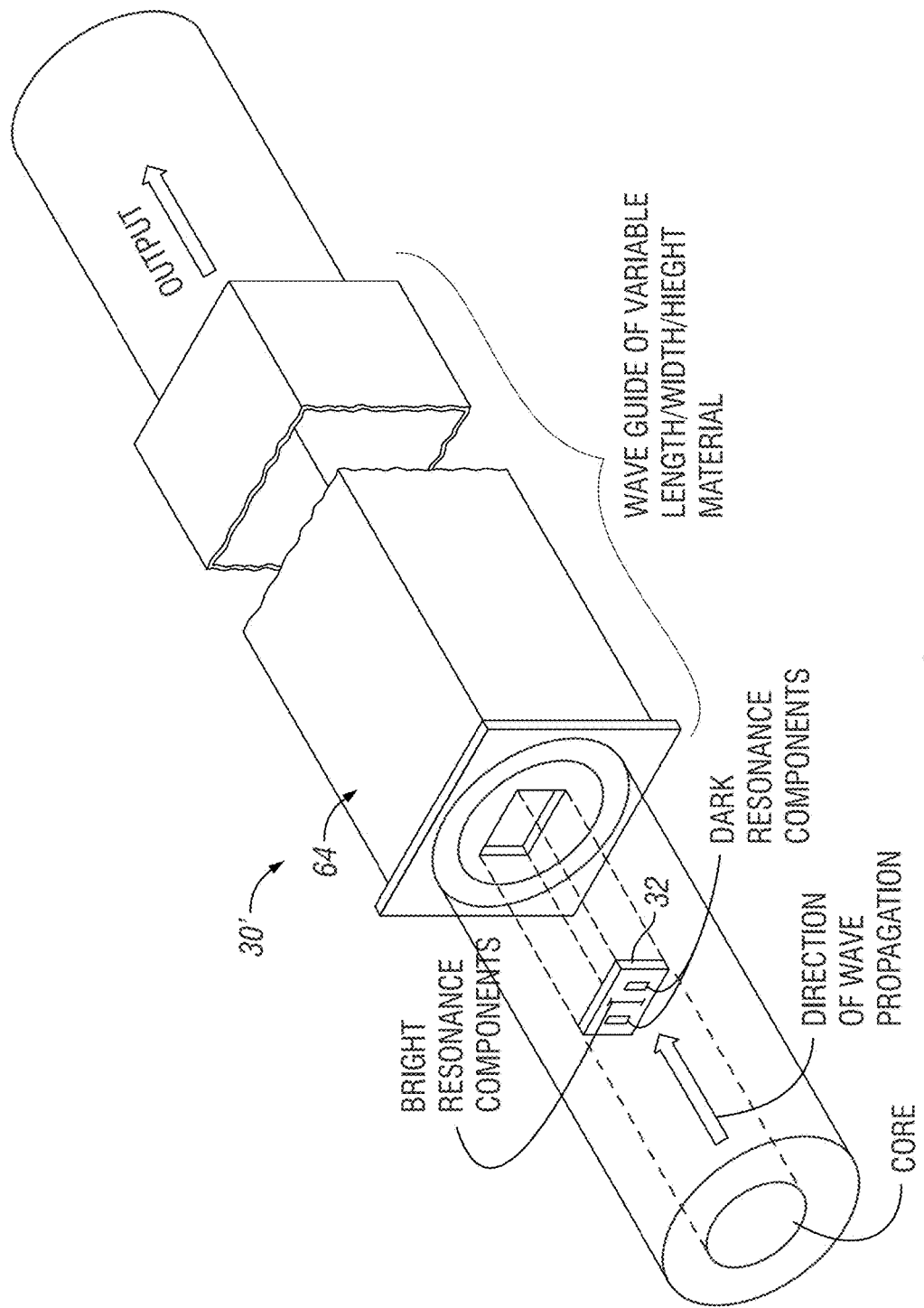
FIG. 1E is a simplified diagrammatic view of an alternative embodiment of a dispersion compensator where a metamaterial sheet is inserted between spliced ends of optical fiber sections.
Figure 1F:
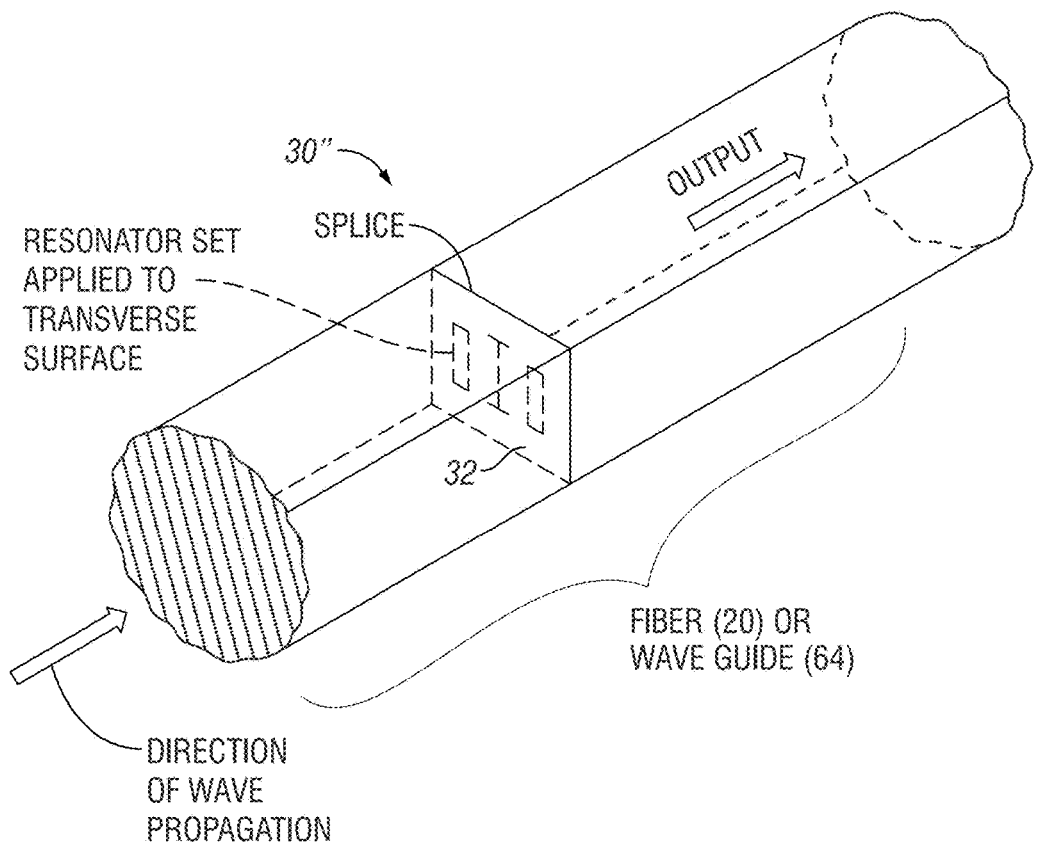
FIG. 1F is a simplified diagrammatic view of an alternative embodiment of a dispersion compensator where a metamaterial sheet is located along a waveguide.

FIGS. 1D-F illustrate additional possible aspects of how metamaterial dispersion compensator 30 can be integrated into fiber 20 or a waveguide.

The plural sheets $40_1, 40_2, 40_3 \ldots 40_n$ can be distributed along the propagation path of fiber core 22 before optical receiver 14. Corresponding spacers $50_1, 50_2, 50_3 \ldots 50_{n+1}$ can be separate members (e.g. blocks of dielectric) or essentially small lengths of the same material as fiber core 22 (see, e.g., FIG. 1C) and are intended to decouple the near fields of each sheet 40 for each other. Generally, the more sheets 40 the more bandwidth. As will be discussed below, both the size/configuration of the elements comprising the meta atoms 48 distributed on at least one face 44 and 46 of the substrate 42 of sheet 40, as well as the spacing between sheets 40 (as regulated by the thickness of spacers 50) can affect the dispersion characteristics of compensator 20 relative to fiber 20 and the optical signal it affects. As is known in the art, there may be some type of interface 60 needed between the adjacent end of fiber core 22 and the upstream side of metamaterial compensator 30 (see, e.g., FIG. 1C). This can be as simple as a splice (e.g. fusion splice) which sandwiches sheet 40 to a cleaved end of core 22. Alternatively it might be some type of mechanical connection or perhaps opto-isolated interface. An interface may also be needed on the downstream end of compensator 30. This may just be a splice. Alternatively, it could be an operative connection to receiver 14. In some instances an amplifier 62 may be included to compensate for amplitude loss. Such amplifiers are typical for systems that use other types of dispersion compensation like Bragg filters or specialty (e.g. W-type) fibers, and are known in the art. Another way is to build a multi-layer structure of spaced apart sheets 40 held in position is to cut the optical fiber and insert a small device between the cut fiber ends. The multiple layers could be fabricated with multiple structure lithographic techniques and installed in the small device. Then the small device could be operatively connected in line with the fiber.

FIG. 1D illustrates in simplistic fashion one way a series of alternating metamaterial sheets 40 and spacers 50 can be constructed. Each metamaterial sheet is pre-fabricated by printing, depositing, self-assembling, or otherwise (by known micro- or nano-scale fabrication techniques) repeated meta atom circuits 48 across face 44 of a very thin substrate 42. Such sheets 40 are mass produced. Small sections of optical fiber, of a predetermined length or lengths are created. The series is sandwiched together and the whole combination inserted in-line with the length L of fiber 20.

Methods of fabrication of sheets 40 of this type are well-known. For example, see U.S. Pat. No. 8,054,146 to Soukoulis et al., incorporated by reference herein. It illustrates several periodically repeating meta atom designs applied to sheet substrates. Other examples are U.S. Pat. No. 6,791,432 to Smith et al., US 2013/0052463 to Shelton et al., and US 2014/0193301 to Xiong et al., each of which are incorporated by reference herein. These patent publications demonstrate different designs and techniques for manufacturing both two-dimensional (including planar or sheet) and three-dimensional metamaterials.

Examples of adding in-line components to optical fibers are disclosed in US 2008/0129980 to Dhawan et al., U.S. Pat. No. 7,349,600 to Chen and U.S. Pat. No. 8,655,123 to Donlagic, all incorporated by reference herein. As can be appreciated by those skilled in the art, any technique used to construct and integrate dispersion compensator 30 into or along fiber 20 should strive to minimize losses, distortions, discontinuities or other detrimental effects on the transmitted signal.

FIG. 1E diagrammatically illustrates a possible alternative construction of metamaterial dispersion compensator 30. Compensator 30' includes a waveguide section 64. Its dimensions would be pre-determined and designed according to need or desire. At least one metamaterial component 32 would be mounted in waveguide 64 along the propagation path. Metamaterial component 32 could be the paired resonator design as shown or other designs. It could be a planar or sheet member. Each sheet could have just one resonator combination (one meta atom) or plural combinations (a number of meta atoms). Generally the more meta atoms the more dispersion. There must be a balancing, however, of bandwidth, dispersion, and loss. It could be a single member or it could be plural members serially aligned along the propagation path.

FIG. 1F diagrammatically illustrates a possible alternative construction of metamaterial dispersion compensator 30. Compensator 30" could include a waveguide section 64 like FIG. 1F. Alternatively it could be a section of optical fiber like core 22 of FIG. 1C. Its characteristics would be pre-determined and designed according to need or desire. At least one metamaterial component 32 would be mounted in waveguide 64 along the propagation path. Metamaterial component 32 could be the paired resonator design as shown or other designs. It could be a planar or sheet member. It could be a single member or it could be plural members serially aligned along the propagation path.

The basic concepts of using EIT principles to design the metamaterial are set forth in Example 2 below. This reproduces the basic contents of Appendix D of the inventors' provisional patent application filed September 2013 and illustrates and discusses how the analog to EIT can be the basis for informing the appropriate artificial structures in the metamaterial for dispersion compensation. The figures referred to in the following description are reproduced with the other figures of this application and are renumbered appropriately. References cited in this description are denoted "[D1]", "[D2]", et seq. and listed in a bibliography at the end. This description is also published at Dastmalchi, Tassin, Koschny, and Soukoulis, "Strong group-velocity dispersion compensation with phase-engineered sheet metamaterials", PHYSICAL REVIEW B 89, 115123 (2014), incorporated by reference herein.

As discussed above, the general invention is a system which purposefully introduces dispersion of the opposite sign to the dispersion that is anticipated to be caused by dispersive medium.

An important feature is that metamaterials can be manufactured to relatively small form factor (at least as compared to long length of dispersion-shifted fibers). Manufacturing tolerances unlikely need to be as precise as other state of the art solutions. While bandwidth may be limited in dispersion-shifted fibers, there is some flexibility on this point.

And, as shown above, each of the artificial structures that introduce strong dispersion in the metamaterials can be engineered to minimize absorption and maximize transmission. As will be understood by those skilled in this technical field, any design of the metamaterial will take into account and balance a variety of factors related to bandwidth, absorption, transmission, and loss, to name a few.

The metamaterial can be implemented in a two-dimensional array or a three-dimensional plurality of arrays where each array is transverse to the propagation direction of the electromagnetic radiation.

The designer can balance the various factors involved and the amount of dispersion that needs compensating (typically related to length of the optical fiber being treated).

FIGS. 1B-D diagrammatically illustrate compensation device 30 made up of many layers or sheets 40 of artificial resonator circuits. In one example, for a 70 km long conventional silica optical fiber, between several hundred to several thousand sheets of two-dimensional metamaterial resembling metal resonators on substrates that are spaced apart by short distances by insulating layers.

Possible alternative implementations include metal resonators on substrates or in a fiber geometry using a Fabry Perot cavity of a mode with angular momentum (not the fundamental mode) as the dark mode.

This embodiment uses the metamaterial instead of the dispersion shifted fiber, Bragg grating, or other dispersion compensation as the dispersion compensating device.

The metamaterial can be made up of one or more sheets of engineered artificial microscopic structures. An example would be individual graphene sheets separated by very thin (on the order of a few wavelengths of the relevant wavelength(s) being compensated) insulating layers to preserve non-interacting sheet conditions and effective bulk conductance. In other words, distance can be designed to be small (a wavelength or two) so the sheets can be fairly dense (e.g. 1000 sheets into 1 cm), but large enough that each sheet acts independently of the others. Essentially the near-fields of the sheets must be decoupled from one another.

Several specific implementations of the concept above will now be described.

C. Example 2

[from Babak Dastmalchi, Philippe Tassin, Thomas Koschny, and Costas M. Soukoulis, Strong group-velocity dispersion compensation with phase-engineered sheet metamaterials, PHYSICAL REVIEW B 89, 115123 (2014)]

Resonant metamaterials usually exhibit substantial dispersion, which is considered a shortcoming for many applications. Here we take advantage of the ability to tailor the dispersive response of a metamaterial, introducing a new method of group-velocity dispersion compensation in telecommunication systems. The method consists of stacking a number of highly dispersive sheet metamaterials and is capable of compensating the dispersion of optical fibers with either negative or positive group-velocity dispersion coefficients. We demonstrate that the phase-engineered metamaterial can provide strong group-velocity dispersion management without being adversely affected by large transmission loss, while at the same time offering high customizability and a small footprint.

We show that dispersion-engineered metamaterials exhibiting a classical analog of electromagnetically induced transparency (EIT) can address the group-velocity dispersion problem without being adversely affected by return loss. Originally, EIT is a quantum-mechanical phenomenon characterized by a narrow transmission window in a relatively wide absorption band [11-16]. The change in the transmission is accompanied by a strongly nonlinear dispersion relation and, hence, by group-velocity dispersion (GVD). Several groups have now demonstrated that the phenomenon can be reproduced in purely classical systems by way of metamaterials [17-24], where the transmission amplitude, the bandwidth, and the center frequency of the transparency window can be modified through the geometry and the constituent material properties. An emerging class of metamaterial designs suggests replacing metallic resonant parts by dielectric elements [25]. Such designs can be extended to communication wavelengths in view of the availability of extremely low-loss dielectrics in this range of the electromagnetic spectrum. By substantially suppressing dissipative losses, dielectric-based metamaterials may allow for quality factors that are orders of magnitude larger than what is possible with plasmonic-based EIT designs. This would inspire a new range of applications, including dispersion compensation.

Let us briefly state the problem in a quantitative way. In telecommunication systems, data are transmitted as a sequence of pulses of a certain shape and width, formed by superposition of frequency-dependent plane waves with a particular weight function, e.g., Gaussian. For a narrow banded pulse, the propagation constant 13 can be expanded around the center frequency $\omega_0$.

$$\beta i = \beta_0 + \beta_1 \Delta\omega + \beta_2 \Delta\omega + \beta_3 \Delta\omega + \ldots, \quad (1)$$

where $$\beta_j = \left. \frac{\partial^j \beta}{\partial \omega^j} \right|_{\omega=\omega_0}, j = 1, 2, 3, \ldots, \quad (2)$$

where $$\beta_1 = \frac{1}{v_g}$$

is the inverse of the group-velocity. $\beta_2$, known as the group-velocity dispersion (GVD) coefficient, manifests itself as a broadening in the pulse width. The higher-order terms result in distortion of the pulse from the initial form, but they are usually negligible due to small strength. Pulse broadening, however, causes intersymbol interference and limits the bit rate of the communication line. To achieve large distance communication, it is necessary to restore the data pulses to the original width using a dispersion compensation method. For this purpose, the broadened pulse is usually sent through a second medium with the opposite sign of dispersion. Indeed, the effect of GVD can be canceled completely if the lengths and magnitudes of the second-order dispersion coefficients for the two media satisfy the following condition:

$$L_1 \beta_2^{M1} + L_2 \beta_2^{M2} = 0, \quad (3)$$

where $L_i$ and $\beta_2^{Mi}$ are the length and GVD of the ith medium, respectively [1]. $L_i \beta_2^{Mi}$ quantifies the total residual dispersion imposed on the pulse after traveling through the ith medium. FIG. 2A shows the behavior of an EIT medium. The transmission phase and, hence, the GVD changes drastically around the transmission peak. Interestingly, GVD has opposite signs around the transmission peak, which can be utilized to manage both negative and positive dispersion by positioning the pulse at the right- or left-hand side of the transmission peak. Theoretically, the mechanism underlying EIT can best be explained by a model of two interacting resonant modes, having nearly the same resonance frequency and differing in coupling strength to the incident electromagnetic field. One mode, known as the radiative (or bright) mode, can strongly couple to the external incident field, while the other, the dark mode, barely couples to the external field. The dark and radiative modes can nevertheless interact with each other through near-field coupling, resulting in strongly resonant and dispersive behavior. It has been experimentally verified that EIT can be implemented as a thin conductive sheet of magnetic and electric meta-atoms [26]. Reflection and transmission of the conductive sheet can be connected to the electric and magnetic conductivity [27], $$r = \frac{2(\zeta \sigma_\|^{(e)} - \zeta^{-1} \sigma_\|^{(m)})}{4 + 2\zeta \sigma_\|^{(e)} + 2\zeta^{-1} \sigma_\|^{(m)} + \sigma_\|^{(e)} \sigma_\|^{(m)}}, \quad (4)$$

$$t = \frac{4 - \sigma_\|^{(e)} \sigma_\|^{(m)}}{4 + 2\zeta \sigma_\|^{(e)} + 2\zeta^{-1} \sigma_\|^{(m)} + \sigma_\|^{(e)} \sigma_\|^{(m)}}.$$

In Eq. (4), $\sigma_\|^{(e)}$ ($\sigma_\|^{(m)}$) is the electric (magnetic) conductivity of the EIT sheet, and $\zeta$ is the wave impedance of the external waves. To satisfy the compensation condition [Eq. (3)], one can either adjust the dispersion of an individual sheet or use multiple EIT sheets. As will be discussed below, multiple sheets might be necessary to perform an ideal dispersion compensation. In addition, metamaterials provide us with the unique opportunity of impedance matching to avoid complications arising from multiple reflections [28]. Applying the impedance matching condition, $\zeta \sigma_\|^{(e)} = \zeta^{-1} \sigma_\|^{(m)}$, Eq. (4) simplifies to $$r = 0, t = \frac{2 - \zeta \sigma_\|^{(e)}}{2 | + \zeta \sigma_\|^{(e)}}. \quad (5)$$

The electric conductivity of a single sheet can be derived by solving a coupled-resonator model [26]:

$$\sigma_\|^{(e)} = -i\omega\xi \frac{D_d(\omega)}{D_r(\omega)D_d(\omega) - \kappa^2}, \quad (6)$$

where $D_d = \omega_d^2 - i\gamma_d \omega - \omega^2$ and $D_r = \omega_r^2 - i\gamma_r \omega - \omega^2$. $\gamma_d$ and $\omega_d$ ($\gamma_r$ and $\omega_r$) are, respectively, the damping factor and resonance frequency of the dark (radiative) mode, and $\kappa$ denotes the near-field coupling strength of the two resonators. $\xi = \epsilon_0 X_x^{static}$ is the static susceptibility of the conductive sheet. For a single EIT sheet, $\beta_2$ can be tailored either by adjusting the coupling strength or by changing $\xi$ (see FIG. 2B). The latter is proportional to the area density of packed resonators. It can be observed in FIG. 2B that increasing either of the parameters κ or ξ increases $\beta_2$ in favor of stronger dispersion compensation, although at the expense of reduced bandwidth of the dispersion curve. The region close to the GVD extrema, defining the $\beta_2$ bandwidth, provides the highest dispersion compensation amplitude. Moreover, the third-order dispersion ($\beta_3$) has its lowest value in this region, although it increases when moving away from the extremal points. Therefore, to take advantage of strong dispersion compensation as well as low pulse distortion due to third-order dispersion, the data pulse should be accommodated well inside the flat band of) $\beta_2$. This imposes a limit on the maximally achievable $\beta_2$ with a single EIT sheet since the bandwidth and magnitude of $\beta_2$, as shown in FIG. 2B, are complementary and cannot be maximized simultaneously. To satisfy Eq. (3) and avoid large pulse distortion at the same time, it is necessary to use multiple EIT sheets. However, it should be kept in mind that accumulated losses from multiple EIT sheets would sacrifice the amplitude of transmitted pulses in exchange for lower distortion. To further understand this tradeoff, we have investigated two different configurations. The first case [FIG. 2C] is designed to show a relatively small GVD in the spectral width of the Gaussian input pulse. The parameters for the individual sheets in this arrangement are $\xi=1.5\times10^{15}/\zeta$, $\kappa=6.76\times10^{28}$, $\gamma_r=0.01\times10^{15}$, and $\gamma=0.000\,001\times10^{15}$. Such small damping rates can be achieved using dielectric-based designs similar to those reported in Ref. [25]. This configuration requires using 908 individual EIT units to satisfy the compensation condition (3). For the second case [see FIG. 2C], $\beta_2$ for a single sheet is boosted by increasing $\xi$ to $4\times10^{15}/\zeta$, resulting in a much more dispersive system (larger $\beta_2^{total}$), but also in increased third-order dispersion in the spectral region of interest. This reduces the number of required sheets to 130. To avoid coupling between the sheets, the individual EIT units are spaced in such a way that they do not sense the near field of neighboring units. The concept of sheet metamaterial is perfectly valid in this case, and the effect of the increasing number of layers is simply linear scaling of the other properties. Therefore, the proposed scheme does not inherit fabrication and design hurdles of bulk metamaterials, where closely stacked unit cells result in hybridization and substantial change to the effective-medium properties, unnecessarily complicating the design without benefiting the performance. FIG. 2C compares the group delay and the two lowest-order total residual dispersion of both cases when used to compensate the GVD of a single-mode step-index fiber. The fiber is considered to have a cylindrical core of radius a and refractive index $n_c$, and a cladding with a refractive index of n. The effective index of the fiber, considering both material and waveguide dispersion, is approximated by [29].

$$n_{eff}=n(1+b\Delta). \qquad (7)$$

The approximation is valid for small index contrast $$\left(\Delta = \frac{n_c - n}{n} \ll 1\right),$$

where $$\upsilon = ak_0\sqrt{n_c^2 - n^2}, \; W = 1.1428\upsilon - 0.996, \; b = \frac{W^2}{\upsilon^2}. \qquad (8)$$

The fiber core diameter is chosen to be 5.3 μm, $\Delta=0.006$, and n is calculated from a Sellmeier model for quenched silica [30]. For the numerical calculations of the wave propagation, a transfer matrix method has been used. Individual EIT sheets are assumed to be decoupled and arranged in a periodic array embedded in the fiber medium. The reflection and transmission coefficients of EIT sheets are calculated from the model in Eq. (5). Numerical values of the dispersion orders are derived from the transmission phase $\Phi_t(\omega)=\text{Im}[\log(t(\omega))]$, where $$\beta_j = \frac{\partial^j \Phi_t(\omega)}{\partial \omega^j}, \; j=1,2,3,\ldots. \qquad (9)$$

It should also be noted that the dark and radiative resonance frequencies are adjusted so that the GVD peak coincides with the center frequency of a Gaussian data pulse of the form $$\hat{E}(\omega - \omega_0) = \sqrt{2\pi\tau_0^2}\, e^{-\frac{1}{2}\tau_0^2 \omega^2},$$

with $\tau_0=10$ ps. The dispersion-compensated pulse, using the first configuration [FIG. 2C], has an electric field amplitude of $|E|=0.0022$, whereas, for the second configuration [FIG. 2C], the amplitude is $|E|=0.639$, showing an almost three orders of magnitude improvement with respect to the first case. The substantial reduction in transmission loss should be attributed only to the avoidance of dissipative losses in the individual EIT sheets, since the radiative loss is eliminated by using impedance matching. Theoretically, loss can be further reduced by decreasing the dark and radiative resonator damping. For purposes of illustration, we have calculated this limit of vanishing damping losses ($\gamma_d=0$ and $\gamma_r=0$) and we have found that the pulse amplitude as well as the pulse width can be restored near to its initial value given that fact that the higher-order dispersions can be minimized arbitrarily by designing a flatter $\beta_2$ extremum and using more EIT sheets.

The resulting pulse shape for the optimal case of FIG. 2C is shown in FIG. 2D. The dispersion-compensated pulse (blue line) is compared with the initial Gaussian (black circles) and the broadened/dispersed pulse (red line). The inset of FIG. 2D shows the small deviation from the initial pulse shape caused by higher-order dispersion, although it is clear from the picture that the Gaussian shape is well preserved in spite of relatively high third-order dispersion.

Finally, FIG. 2D shows a random pulse train launched into the fiber. The red curve plots the pulse train after traveling 25 km inside the fiber, and the blue curve plots the pulse train after passing through 130 EIT sheets. The center-to-center separation of pulses in this case is 75 ps. There is significant intersymbol interference (overlapping of pulses) in the dispersed signal, but because of the excellent dispersion compensation, intersymbol interference is completely removed in the compensated final pulse train. While the form and bandwidth of the pulses are almost perfectly restored to their initial values, the amplitude is damped to 63.9% of the initial pulse amplitude, still a very good result that is not achievable with other GVD compensation methods. In conclusion, we have demonstrated a proof-of-principle of a dispersion-compensation system using phase-engineered metamaterials providing a highly customizable dispersion band. The system can be fabricated in a compact volume using nanofabrication methods, and it can be easily integrated into the communication line. The phase-engineered metamaterial can provide strong group-velocity dispersion without being adversely affected by large transmission loss. Higher-order dispersion introduced by the system is in tradeoff with dissipation, and one can be exchanged for another depending on the specific line requirements.

Work at Ames Laboratory was partially supported by the US Department of Energy, Office of Basic Energy Science, Division of Materials Science and Engineering (Ames Laboratory is operated for the US Department of Energy by Iowa State University under Contract No. DE-AC02-07CH11358), by the US Office of Naval Research, Award No. N00014-10-1-0925 (Simulations). Work at FORTH (theory) was supported by the European Research Council under the ERC advanced Grant No. 320081 (PHOTOMETA).

Additional Details Regarding Figures in Example 2

FIG. 2A. (Color online) Transmission amplitude (black), transmission phase (blue), and group-velocity dispersion (red) for a generic EIT system. The gray line shows the spectral distribution of a Gaussian pulse of the form $$\hat{E}(\omega - \omega_0) = \sqrt{2\pi\tau_0^2 e^{-\frac{1}{2}\tau_0^2(\omega-\omega_0)^2}}$$

to be dispersion-compensated. $\tau_0$=10 ps, which corresponds to a bandwidth of 0.18 nm, or a transmission rate of at least 10 Gbit/s.

FIG. 2B. (Color online) (a) Variation of GVD with regard to the changes in the static susceptibility $\xi = \epsilon_0 X_{se}^{static}$ with $\kappa$=9.00×10$^{28}$. (b) Variation of GVD with regard to the changes in the coupling efficiency $\kappa$ with $\xi$=1×10$^{15}$/$\zeta$, $\gamma_r$=0.01×10$^{15}$ and $\gamma_d$=0.000 001×10$^{15}$ in both figures.

FIG. 2C. (Color online) The change in the group delay, second-, and third-order total residual dispersion for (a) 25 km long fiber, (b) 908 EIT layers with $\xi$=1.5×10$^{15}$/$\zeta$, and (c) 130 EIT layers with $\xi$=4×10$^{15}$/$\zeta$. Gray shaded area shows the spectral distribution of the Gaussian pulse with $t_0$=10 ps. Resonance frequency of both EIT models is chosen to reach to the maximum dispersion at the center frequency of the Gaussian pulse.

FIG. 2D. (Color online) (a) Comparison of broadened, compressed, and initial pulses for 130 EIT sheets with $\xi$=4×10$^{15}$/$\zeta$. Inset shows the deviation from the initial Gaussian shape due to higher-order dispersion. (b) A train of broadened Gaussian pulses at the end of a 25 km fiber before (red) and after (blue) dispersion management using the array of metamaterial sheets. (The red curve is normalized to the amplitude of the output pulses.)

REFERENCES CITED IN EXAMPLE 2

[1] G. P. Agrawal, *Fiber-Optic Communication Systems*, Wiley Series in Microwave and Optical Engineering (Wiley, New York, 2010).
[2] S. Ramachandran, *Fiber Based Dispersion Compensation*, Optical and Fiber Communications Reports Vol. 5 (Springer, New York, 2007).
[3] D. R. Smith, J. B. Pendry, and M. C. K. Wiltshire, Science 305, 788 (2004).
[4] R. Engheta and R. W. Ziolkowski, *Metamaterials, Physics and Engineering Explorations* (Wiley-IEEE, New York, 2006).
[5] V. M. Shalaev, Nat. Photon. 1, 41 (2007).
[6] Y. Liu and X. Zhang, Chem. Soc. Rev. 40, 2494 (2011).
[7] C. M. Soukoulis and M. Wegener, Nat. Photon. 5, 523 (2011).
[8] N. I. Zheludev and Y. S. Kivshar, Nat. Mater. 11, 917 (2012).
[9] N. Yu, P. Genevet, M. A. Kats, F. Aieta, J.-P. Tetienne, F. Capasso, and Z. Gaburro, Science 334, 333 (2011).
[10] F. Aieta, P. Genevet, M. a. Kats, N. Yu, R. Blanchard, Z. Gaburro, and F. Capasso, Nano Lett. 12, 4932 (2012).
[11] S. E. Harris, J. E. Field, and A. Imamoglu, Phys. Rev. Lett. 64, 1107 (1990).
[12] S. E. Harris, Phys. Today 50(7), 36 (1997).
[13] M. Fleischhauer and M. D. Lukin, Phys. Rev. Lett. 84, 5094 (2000).
[14] A. Matsko and O. Kocharovskaya, Adv. At. Mol. Opt. Phys. 46, 191 (2001).
[15] P. Mandel, Hyperfine Interact. 135, 223 (2001).
[16] M. Fleischhauer, A. Imamoglu, and J. Marangos, Rev. Mod. Phys. 77, 633 (2005).
[17] V. A. Fedotov, M. Rose, S. L. Prosvirnin, N. Papasimakis, and N. I. Zheludev, Phys. Rev. Lett. 99, 147401 (2007).
[18] S. Zhang, D. A. Genov, Y. Wang, M. Liu, and X. Zhang, Phys. Rev. Lett. 101, 047401 (2008).
[19] P. Tassin, L. Zhang, T. Koschny, E. N. Economou, and C. M. Soukoulis, Opt. Express 17, 5595 (2009).
[20] V. Yannopapas, E. Paspalakis, and N. V. Vitanov, Phys. Rev. B 80, 035104 (2009).
[21] N. Liu, L. Langguth, T. Weiss, J. Kästel, M. Fleischhauer, T. Pfau, and H. Giessen, Nat. Mater. 8, 758 (2009).
[22] Z. Han and S. I. Bozhevolnyi, Opt. Express 19, 3251 (2011).
[23] X. R. Jin, Y. H. Lu, H. Y. Zheng, Y. P. Lee, J. Y. Rhee, and W. H. Jang, J. Korean Phys. Soc. 58, 973 (2011).
[24] L. Verslegers, Z. Yu, Z. Ruan, P. B. Catrysse, and S. Fan, Phys. Rev. Lett. 108, 083902 (2012).
[25] A. Jain, P. Tassin, T. Koschny, and C. M. Soukoulis, Phys. Rev. Lett. 112, 117403 (2014).
[26] P. Tassin, T. Koschny, and C. M. Soukoulis, J. Phys. B 407, 4062 (2012).
[27] P. Tassin, L. Zhang, R. Zhao, A. Jain, T. Koschny, and C. M. Soukoulis, Phys. Rev. Lett. 109, 187401 (2012).
[28] C. Pfeiffer and A. Grbic, Phys. Rev. Lett. 110, 197401 (2013).
[29] C. T. Chang, Appl. Opt. 18, 2516 (1979).
[30] J. Fleming, Electron. Lett. 14, 326 (1978).

D. Example 3

The following description provides additional background discussion and support for the basic concepts of using EIT principles to design the metamaterial. It also provides specific examples of an inline metamaterial dispersion compensator for an optical fiber. This reproduces the basic contents of Appendix E of the inventors' provisional patent application filed September 2013. The figures referred to in the following description are reproduced with the other figures of this application and are renumbered appropriately. References cited in this description are denoted "[E1]", "[E2]", et seq. and listed in a bibliography at the end.

Dispersion Management with EIT Metamaterials

1. Introduction

Dispersion management in optical fibers has been an essential requirement of optical telecom-munication networks. Presence of dispersive effects can cause a significant broadening in the pulse width and lead to inter-symbol interference at the end of an optical transmission line. The main source of dispersion in a single mode optical fiber is material dispersion. Most of optical fibers are made of silica which has a zero dispersion point at around 1300 nm. Adopting this wavelength for optical telecommunication would eliminate material dispersion; however, can dramatically amplify other destructive nonlinear effects such as four wave mixing. This entails maintaining a nonzero but small dispersion at the functional range. On the other hand, Erbium doped optical amplifiers functioning at a narrow band around 1.55 μm have been proved more efficient than their 1.3 μm counterparts. These would motivate fiber optics manufacturers to modify the zero dispersion point of single mode fibers to work at 1.55 μm band. For these kinds of fibers, the nonzero dispersion at the working frequency band can be either positive or negative by design. This can be realized by giving a special index profile to the fiber, e. g., w profile fibers. For the sake of simplicity we limit ourselves to the 1D case which can address the issue within acceptable accuracy. Propagation of an electromagnetic pulse in frequency domain and time domain can respectively be represented by Eq.1.1 and Eq.1.2.

$$E(x, \omega-\omega_0) = E(0, \omega-\omega_0) e^{i(k(\omega)x)} \quad (1.1)$$

$$E(x, t) = \frac{1}{2\pi} \int_{-\infty}^{+\infty} \hat{E}(0, \omega - \omega_0) e^{i(k(\omega)x - \omega t)} d\omega \quad (1.2)$$

For a narrow band pulse, the wave number $k(\omega)$ can be expanded around the center frequency of the pulse $$k(\omega) = k(\omega)\bigg|_{\omega=\omega_0} + \frac{\partial k(\omega)}{\partial \omega}\bigg|_{\omega=\omega_0} + \frac{1}{2}\frac{\partial^2 k(\omega)}{\partial \omega^2}\bigg|_{\omega=\omega_0} + \ldots \quad (1.3)$$

or $$k(\omega) = k(\omega_0) + k'(\omega_0)(\omega - \omega_0) + \frac{1}{2}k''(\omega_0)(\omega - \omega_0)^2 + \ldots \quad (1.4)$$

assuming a Gaussian shape for the pulse and keeping up to the third term of the approximation we will have $$\hat{E}(0, \omega - \omega_0) = \sqrt{2\pi\tau_0^2}\, e^{-\frac{1}{2}\tau_0^2 \omega^2}$$

$$E(x, t) \approx \frac{1}{2\pi} \sqrt{2\pi\tau_0^2}\, e^{i(k(\omega_0)x - \omega_0 t)} e^{-\frac{ik''x - \omega^2}{2(\tau_0^2 - ik''x)}} \quad (1.5)$$

$$\int_{-\infty}^{+\infty} e^{-\frac{1}{2}(\tau_0^2 - ik''x)\left(\omega^2 - i\frac{k''x - 1}{\tau_0^2 + ik''x}\right)^2} d\omega' =$$

$$e^{i(k(\omega_0)x - \omega_0 t)} e^{-\frac{(k''x - 1)^2}{2(\tau_0^2 - ik''x)}} \sqrt{\frac{\tau_0^2}{\tau_0^2 - ik''x}}$$

$k'(\omega)$ in Eq.1.3, the inverse group velocity, represents the speed of pulse envelope inside the medium. Second derivative of k, $k''(\omega)$, as a measure of material dispersion, leads to pulse broadening as the pulse keeps travelling inside the dispersive medium. The width of broadened pulse can be related to the one from non-broadened pulse.

$$\tau_x = \tau_0 \sqrt{1 + \left(\frac{ik''x}{\tau_0^2}\right)^2} \quad (1.6)$$

Higher order dispersion terms can be taken into account straightforwardly if higher accuracy is demanded, however it is practically adequate to consider up to the second order dispersion, as we did here. Since the strength of broadening is proportional to the length of the medium, it sounds more appropriate to restate everything in terms of group delay (GD) and group delay dispersion (GDD) by multiplying to the length of medium (d).

$$\Delta t_g = k'(\omega)d$$

$$D_{GD} = k''(\omega)d \quad (1.7)$$

Broadening can be compensated by sending the pulse through another medium with opposite sign of dispersion so that $$k_1''(\omega)d_1 + k_2''(\omega)d_2 = 0 \quad (1.8)$$

Figure 3A:
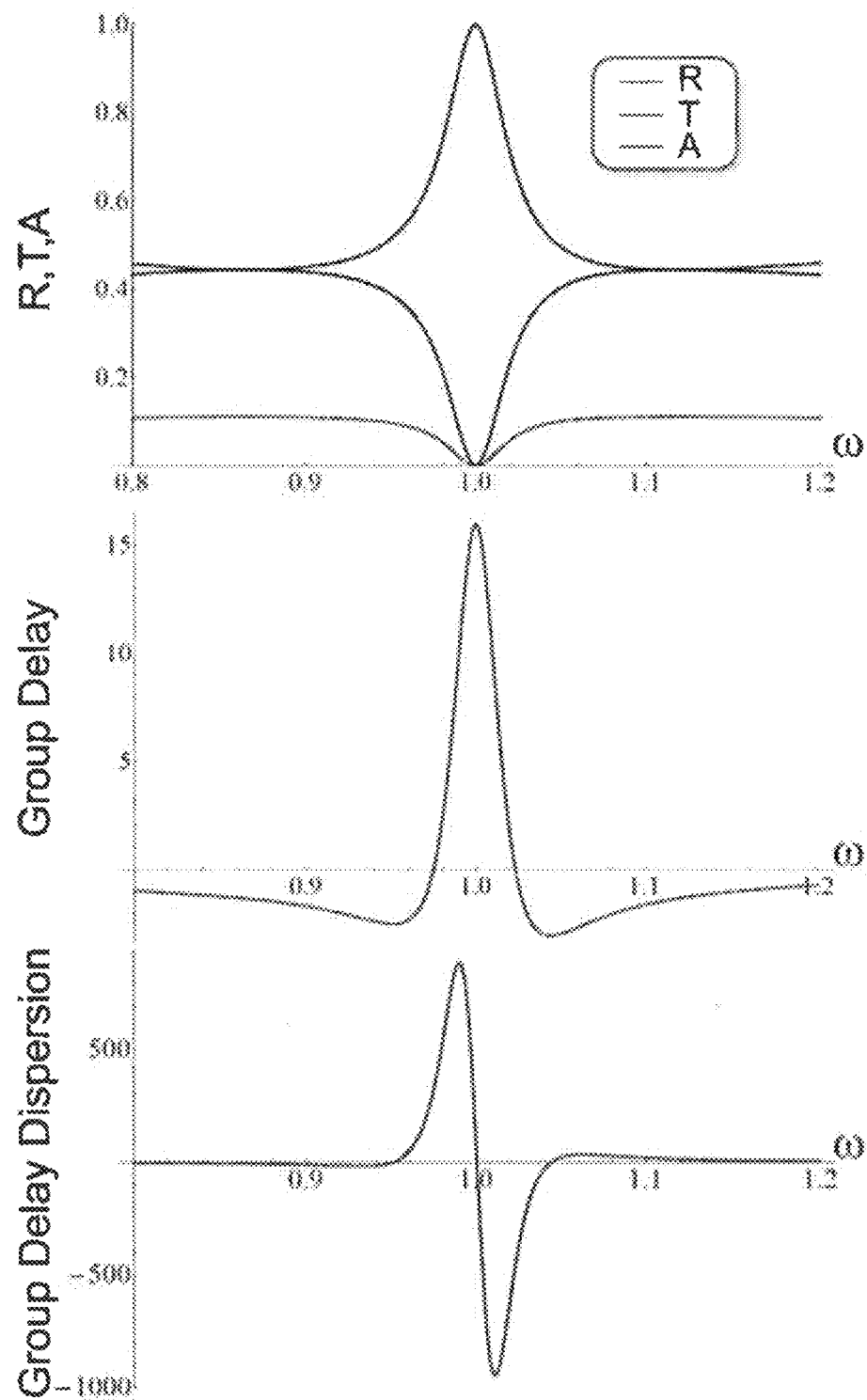

$d_1$ and $d_2$ respectively show the length of medium 1 and medium 2. In the following we introduce a novel method of dispersion management utilizing Electromagnetically InducedTransparency (EIT) materials which provide a large dispersion in a narrow transmission band. Phenomena of EIT can be explained as a system of at least two resonant modes, having nearly the same resonance frequency $\omega_0$, differing in the coupling strength to the incident electromagnetic field. One mode, known as radiative or bright mode, can strongly couple to the external incident field, while the other, labeled as non-radiative or dark mode, barely couples to the external field. This leads to a low (high) quality factor, for the bright (dark) mode. These modes, on the other hand can couple to each other with a tunable coupling strength resulting in the transfer of energy to a guided mode of the system, which opens a transparency window in the absorption spectra (FIG. 3A). High GD and GDD are specifics of EIT, making it interesting for telecommunication applications. The simplest case of two coupled resonators can be modeled by Eq.1.9.

$$\ddot{q}_0(t) + \gamma_0 \dot{q}_0(t) + \omega_0^2 q_0(t) + \lambda_{01} q_1(t) = f_0$$

$$\ddot{q}_1(t) + \gamma_1 \dot{q}_1(t) + \omega_1^2 q_1(t) + \lambda_{10} q_0(t) = f_1 \quad (1.9)$$

$q_0(t)$, gamma$_0$ and $\omega_0$ ($q_1(t)$, gamma$_1$ and $\omega_1$) respectively show the charges, damping factor and resonance frequency of dark (bright) mode. $\lambda_{jk}$ denotes the coupling strength of mode j to mode k, and $f_j$ is the driving force proportional to the external field. Assuming a time harmonic solution $q_j(t)$ exp(-iwt) and a symmetric coupling ($k_{jk} = \lambda_{kj}$), Eq.1.9 can be recast in the following form $$\begin{pmatrix} \omega_0^2 - i\gamma_0\omega - \omega^2 + \lambda & -\lambda \\ -\lambda & \omega_1^2 - i\gamma_1\omega - \omega^2 + \lambda \end{pmatrix} \begin{pmatrix} q_0 \\ q_1 \end{pmatrix} = \begin{pmatrix} f_0 \\ f_1 \end{pmatrix} \quad (1.10)$$

Explicit time dependence of q is dropped for the sake of simplicity. Considering the zero coupling of the external field to the dark mode ($f_0 = 0$) we end up with the following equation for the bright mode $$q_1 = \frac{D_0 f_1}{D_0 D_1 - \lambda^2} \tag{1.11}$$

where $D_0 = \omega_0^2 - i\gamma_0\omega - \omega^2$ and $\omega_1^2 - i\gamma_1\omega - \omega^2$ Indirect contribution of the dark mode is implicit in the coupling factor $\lambda$. Assuming the EIT system as a single layer, thin sheet of metamaterial, which is the case for practical metamaterial EITs studied to date [reference], in-plane effective conductivity can be calculated as $$\sigma_\parallel \propto \frac{j_\parallel}{f_1} \propto \frac{q_{1(eff)}}{f_1} \propto \frac{D_0 f_1}{D_0 D_1 - \lambda^2} \tag{1.12}$$

Consequently the relation of in plane effective electric and magnetic conductivities to the scattered fields reads $$\sigma_\parallel^{(e)} = \frac{2}{\zeta}\left(\frac{1-r-t}{1+r+t}\right) \tag{1.13}$$

$$\sigma_\parallel^{(m)} = 2\zeta\left(\frac{1+r-t}{1-r+t}\right)$$

Where, r and t are complex reflection and transmission coefficients. Inversion of Eq. 1.13 uniquely leads to $$t = \frac{4 - \sigma_\parallel^{(e)}\sigma_\parallel^{(m)}}{4 + 2\zeta\sigma_\parallel^{(e)} + 2\zeta^{-1}\sigma_\parallel^{(m)} + \sigma_\parallel^{(e)}\sigma_\parallel^{(m)}} \tag{1.14}$$

$$r = \frac{2(\zeta\sigma_\parallel^{(e)} - \zeta^{-1}\sigma_\parallel^{(m)})}{4 + 2\zeta\sigma_\parallel^{(e)} + 2\zeta^{-1}\sigma_\parallel^{(m)} + \sigma_\parallel^{(e)}\sigma_\parallel^{(m)}}$$

Details of the derivation can be found in reference [Physica B]. For a purely electric EIT system, equations can be simplified to yield $$t = \frac{2}{2 + 2\zeta\sigma_\parallel^{(e)}} \tag{1.15}$$

$$r = \frac{\zeta\sigma_\parallel^{(e)}}{2 + 2\zeta\sigma_\parallel^{(e)}}$$

Derived transmission and reflection coefficients will be used to build the transfer matrix of the EIT arrays in the following section. Group delay and Group delay dispersion can in turn be calculated from transmission coefficient $$\Delta t_g = \mathrm{Im}\left\{\frac{\partial \log[t(w)]}{\partial w}\right\} \tag{1.16}$$

$$D_{GD} = \frac{\partial \Delta t_g}{\partial w}.$$

FIG. 3A shows different properties for a typical EIT system with given parameters.

2. Boundary Conditions

Scattering of electromagnetic waves from a homogeneous interface can be modeled using Maxwell's equations and appropriate boundary conditions [Wave propagation, Optical waves in layered media]. For a single interface problem (2.1(a)) fields in left and right hand sides of the interface can be related with the following equation $$I_0\begin{pmatrix}A_0\\B_0\end{pmatrix} = I_1\begin{pmatrix}A_1\\B_1\end{pmatrix} \tag{2.1}$$

or $$\begin{pmatrix}A_0\\B_0\end{pmatrix} = I_0^{-1}I_1\begin{pmatrix}A_1\\B_1\end{pmatrix} \tag{2.2}$$

Where for s- and p-polarizations we have $$I_j(s) = \begin{bmatrix} 1 & 1 \\ \sqrt{\frac{\varepsilon_j}{\mu_j}}\cos(\theta_j) & -\sqrt{\frac{\varepsilon_j}{\mu_j}}\cos(\theta_j) \end{bmatrix}$$

$$I_j(p) = \begin{bmatrix} \cos(\theta_j) & \cos(\theta_j) \\ \sqrt{\frac{\varepsilon_j}{\mu_j}} & -\sqrt{\frac{\varepsilon_j}{\mu_j}} \end{bmatrix}$$

This can be generalized for multiple interfaces by taking into account phase relation between two consecutive interfaces. Two interface case is shown as an example (FIG. 3B(b))

$$\begin{pmatrix}A_0\\B_0\end{pmatrix} = I_0^{-1}I_1 P_1(d_1) I_1^{-1} I_2 \begin{pmatrix}A_2\\B_2\end{pmatrix} \tag{2.3}$$

$P_j(d_j)$ is the propagation matrix for medium j and contains phase relation for the propagation distance of $d_j$.

$$P_j(d_j) = \begin{bmatrix} e^{-ik_j d_j} & 0 \\ 0 & e^{ik_j d_j} \end{bmatrix}$$

Multiplication of interface matrices in the right hand side of Eq.2.3 can be replaced by matrix M, which contains transmission and reflection coefficients for the whole slab $$\begin{pmatrix}A_0\\B_0\end{pmatrix} = \begin{bmatrix} M_{11} & M_{12} \\ M_{21} & M_{22} \end{bmatrix}\begin{pmatrix}A_2\\B_2\end{pmatrix} \tag{2.4}$$

With M11=1/t, M12=−r/t, M21=r'/t and M22=(tt'−rr')/t. r and t (r' and t') are reflection and transmission coefficients when the incident wave comes from the left (right) side of the slab. Since the coefficients of EIT current sheet are derived for the symmetric case, we will assume r=r' and t=t' hereafter.

To avoid additional reflections and simplify the calculations we embed EIT inside the fiber. GDD of a single EIT sheet might not be sufficient to cancel the dispersion of a long fiber; therefore, we consider a periodic arrangement of equally spaced EIT sheets. Each unit cell consists of an EIT sheet placed at the end of a fiber slab with thickness A. This provides a symmetric condition for all EIT sheets. The entire EIT array can be shown by the following matrix relation.

$$\begin{pmatrix} A_i \\ B_i \end{pmatrix} = [P_{fiber}(\Lambda)M_{EIT}]^N \begin{pmatrix} A_f \\ B_f \end{pmatrix} \quad (2.5)$$

or $$\begin{pmatrix} A_i \\ B_i \end{pmatrix} = M_{array} \begin{pmatrix} A_f \\ B_f \end{pmatrix} \quad (2.6)$$

$M_{array}$ can be replaced by the Chebishev polynomial form.

3. Results

Although a single sheet of EIT provides a significantly large GDD, it is still not sufficient to compensate the dispersion caused by a very long fiber. This issue can be tackled by using more than one EIT sheets. A periodic arrangement of EIT layers would solve the problem, but this should be considered that reflections can pile up to make dispersive behavior of the EIT grating different than a single EIT layer (FIGS. 3C-F). There are ways to decrease reflection down to a certain point, by optimizing the parameters, but even a small reflection can show a destructive effect on the procedure of dispersion compensation. Although, it is not possible to entirely eliminate the reflection for a purely electric BIT system, this can be done for an electromagnetic BIT by providing matching condition. The new form of Eq.1.14 for zero reflection reads $$r = 0 \quad (3.1)$$
$$t = \frac{2 - \sigma_{\parallel}^{(e)}}{2 + \sigma_{\parallel}^{(e)}}$$

Figure 3B:
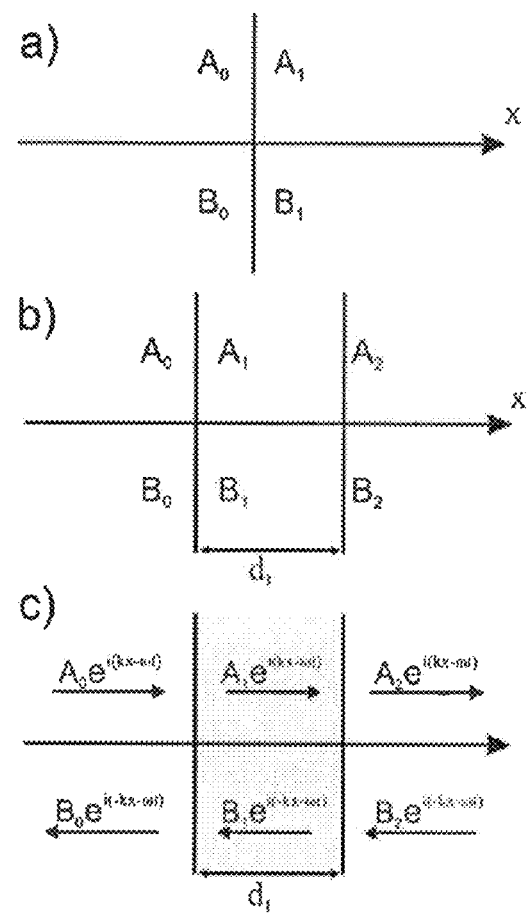
Figure 3B:
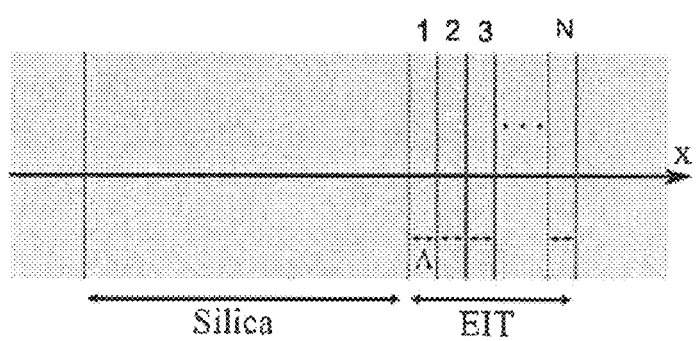
Figure 3C:
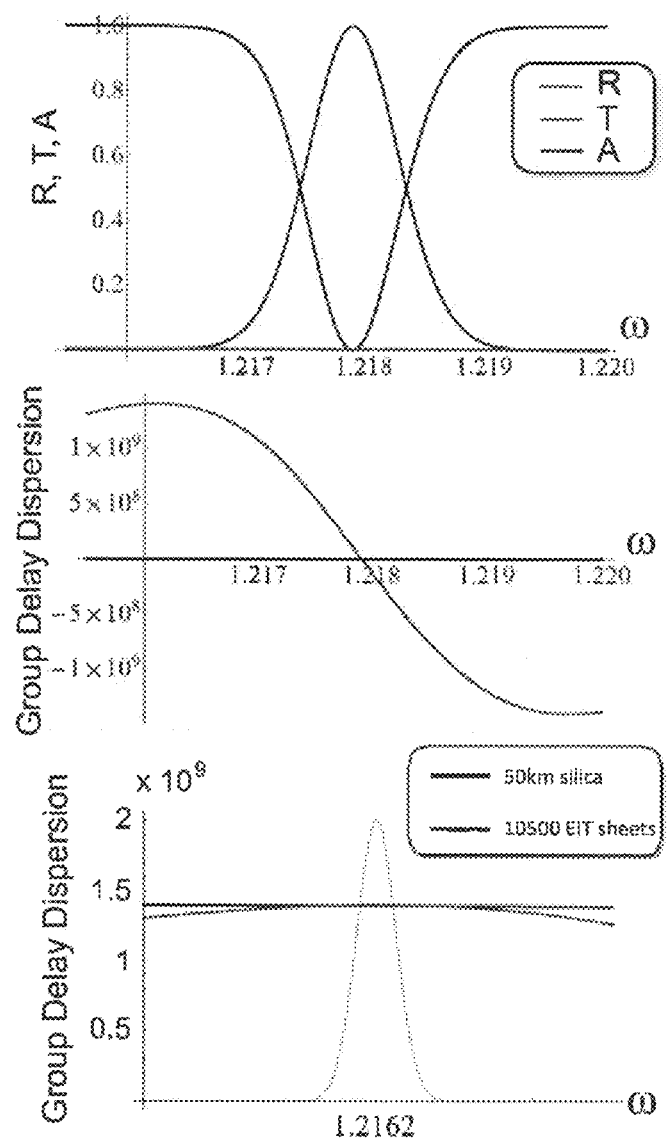

FIG. 3C shows optical response and GDD for the EIT used for dispersion compensation in the current section. Comparison of GDD for 50 km long silica medium with an array of equally spaced EIT sheets is shown in FIG. 3C. Dispersion shape of EIT is adjusted to be equal to the shape of fiber GDD in the range of interest which is a 20 ps Gaussian pulse centered at 1.SS11m telecommunication wavelength.

Figure 3D:
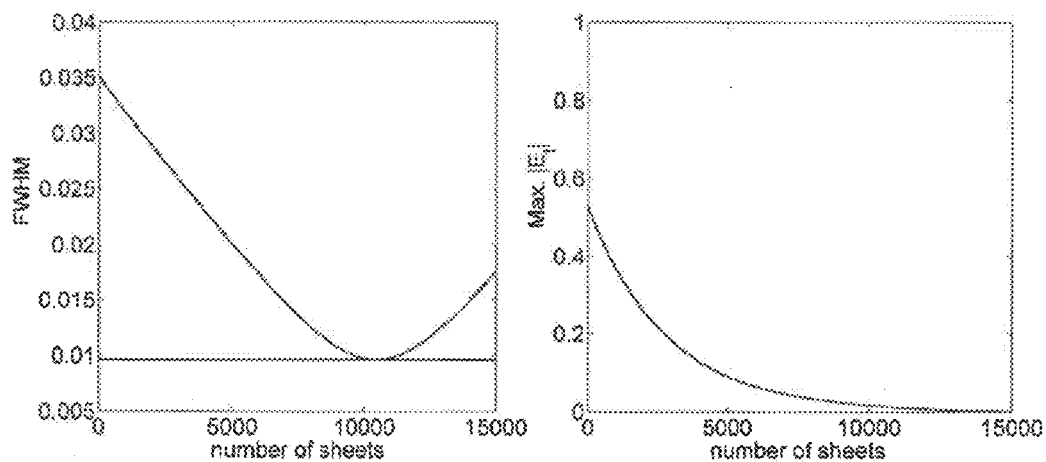

FIG. 3D.a Shows FWHM (full width at half maximum) versus number of EIT layers (curve). FWHM at the initial point of silica medium (line) is 0.00963 m and after passing through 50 km of silica reaches to 0.035 m while the maximum amplitude of the pulse drops from unity at the initial point to 0.53 at the end of silica medium, before the EIT array. By increasing the number of BIT layers, pulse width tends to decrease and as it was predicted by comparing dispersion curves (FIG. 3F) is fully compressed back to the initial width after 10500 EIT layers. Since EIT phenomena are accompanied by losses, the maximum amplitude cannot be restored to the initial value (unity). Maximum amplitude of the pulse after dispersion compensation drops to %1.4 of the initial pulse amplitude. This cannot be a major issue since other methods of dispersion management also need a pulse amplification stage afterwards.

Figure 3E:
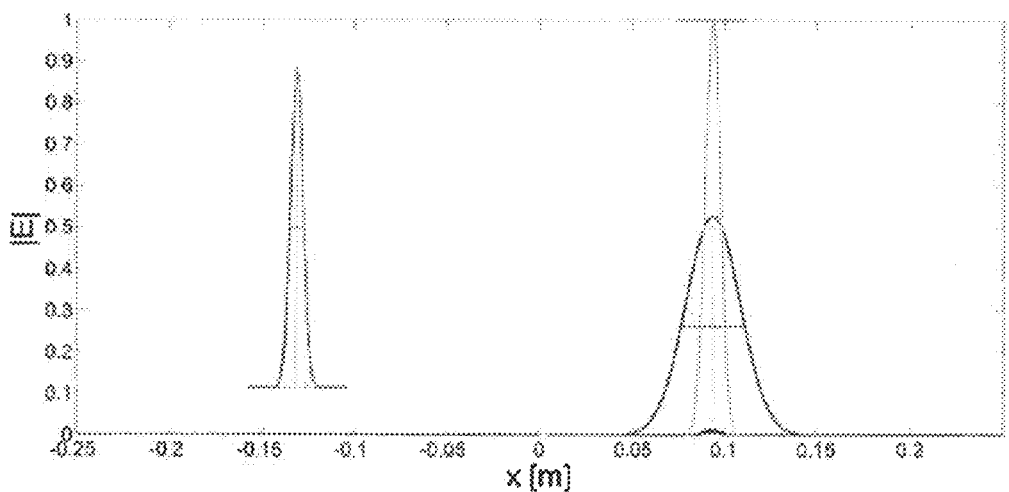

FIG. 3E compares the pulse shape and amplitude before and after broadening to the dispersion managed pulse. Inset is a comparison of initial and final pulse shapes it is obvious that the final pulse shape is almost identical to the initial pulse shape.

Figure 3F:
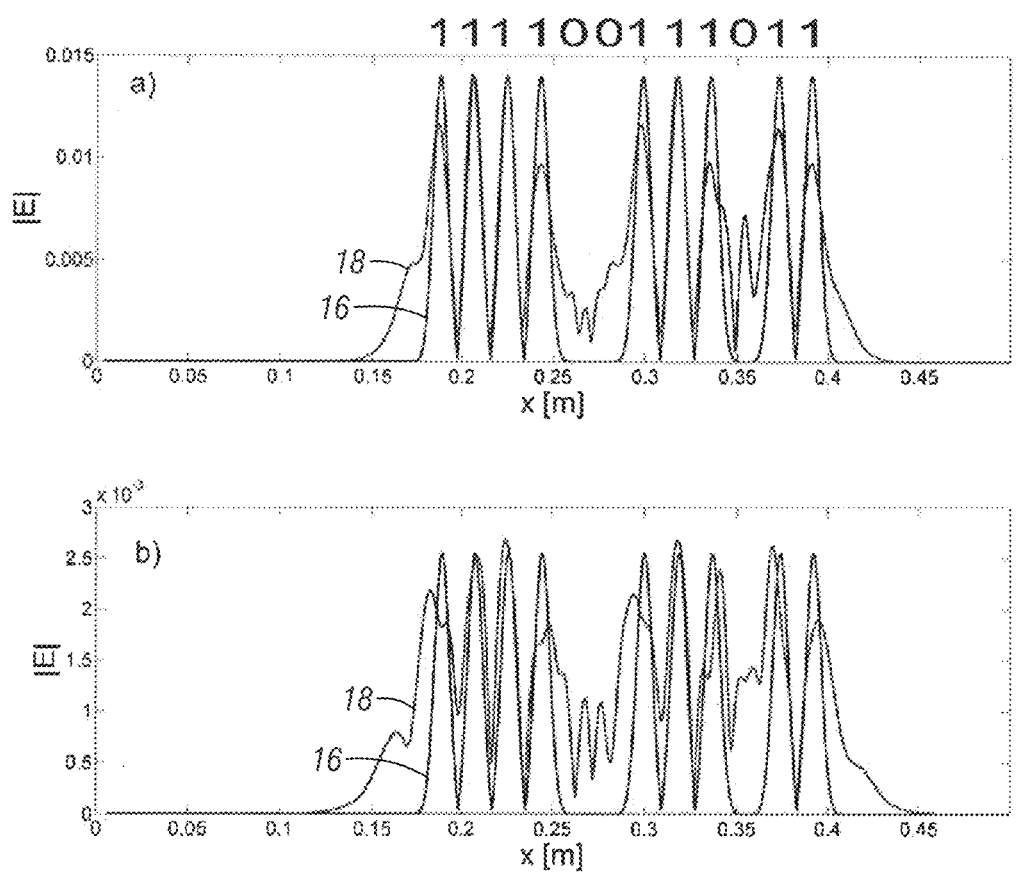

FIG. 3F shows a random sequence of symbols before and after dispersion management Red curves shows scrambling of the symbols after traveling through Silica medium and blue cures are dispersion managed signals.

4. Conclusions

EIT materials show a very strong dispersion inside their transmission window where the absorption is relatively low compared to the other resonant structures such as negative index materials. This makes them an efficient tool for dispersion engineering. Such structures can also be accommodated micro-scale volumes.

Additional Description of Figures

FIG. 3A: a) Transmittance, reflectance and absorbance. b) Group delay c) Group delay dispersion, for $\gamma_0=1\times10^{-4}$, $\gamma_1=1$, $\lambda=(0.5)^2$, $\omega_0=1$.

FIG. 3B: a) Field amplitudes at the right and left hand sides of a single interface. $A_j$ and $B_j$ respectively represent the right and left propagating fields. b) Same as (a) for a three phase (two interface) medium. c) Time and position dependent propagating fields for a three phase medium.

FIG. 3C: a) R, T and A for 10500EIT layers defined by: $\gamma_0=1\times10^{-9}$, $\omega_1=4\times10^{-4}$. $\lambda=(0.26)^2$, $\omega_0=1.2179$. b) GDD for the same parameters as in (a). c) GDD for 50 km silica medium compared with 10500 EIT sheets. Actual sign of GDD for silica is negative; absolute value is shown for the sake of comparison. A 20 ps pulse centered at 1.55 is used for simulations.

FIG. 3D: a) FWHM vs. number of BIT sheets. Straight line shows the initial pulse width (at the beginning of fiber). Curved and straight lines converge for 10500 sheets. b) Maximum amplitude of the output pulse vs number of BIT sheets. The amplitude for 10500 Sheets is 0.014.

FIG. 3E: Comparison of widths and amplitudes, for initial, broadened (at 0.1 m) and dispersion managed (small "bump" at 0.1 m) pulse. Inset compares the shape of dispersion managed pulse with the scaled initial pulse.

FIG. 3F: Random sequence of pulses before and after dispersion management for: a) 50 km Silica medium and 10500 EIT sheets and b) 70 km Silica and 14700 EIT sheets. Curve 16 is scaled to match the amplitude of the curve 15.

As can be seen in the foregoing description, a specific implementation of metamaterials inline with optical fiber engineering for dispersion compensation is set forth.

V. Options and Alternatives

It is to be appreciated that a variety of options, alternatives, or variations are possible while implementing the generic ideas of the invention. Several different examples have been set forth above. These are neither inclusive nor exclusive of all forms they could take. Variations obvious to those skilled in the art would be included.

By way of example and not limitation, several examples are set forth below.

1. Alternative Meta Atoms

The following illustrate examples of specific resonator configurations, and their circuit equivalents, that are envisioned as possibilities for each meta atom of the metamaterial. The term "meta atom" refers to each small engineered sub-wavelength structure of the metamaterial that is used to compensate for dispersion:

Two coupled split ring resonators (SRR). See for details, Tassin, Philippe, et al. "Low-loss metamaterials based on classical electromagnetically induced transparency." *Physical Review Letters* 102 (2009): 053901, which is hereby incorporated by reference herein. (Appendix F to provisional application). A species of meta atoms comprising a set of resonators are possible. For details see: Tassin, Philippe et al., "Planar Designs For Electromagnetically Induced Transparency And Metamaterials", OPTICS EXPRESS, Volume 17, No. 7, 30 Mar. 2009, pages 5595-5605, incorporated by reference herein. (Appendix G to provisional application)

A still further example of a meta atom and its operation is at: Tassin, Phillippe, et al., "Electromagnetically Induced Transparency and Absorption in Metamaterials: The Radiating Two-Oscillator Model and its Experimental Confirmation", PHYSICAL REVIEW LETTERS 109, 187401 (2012), including Supplemental Material at http://link.aps.org/supplemental/10.1103/PhysRevLett.109.187401, incorporated by reference herein. (Appendix H to provisional application)

An additional variation of a possible implementation of the invention is at: Kurter, Cihan, et al., "Classical Analogue of Electromagnetically Induced Transparency with a Metal-Superconductor Hybrid Metamaterial", PHYSICAL REVIEW LETTERS 107, 043901(2011), including Supplemental Material at http://link.aps.org/supplemental/10.1103/PhysRevLett.107.043901, incorporated by reference herein. (Appendix I to provisional application)

The meta atoms can be made of metal or other materials. They can be arranged periodically or otherwise. They affect waves of light. They are sub-wavelength size (smaller than the wavelength of the waves they affect). The number of meta atoms and sheets of meta atoms can vary. For example, these factors can be related to the length and mode of an optical fiber.

As indicated earlier, the designer must not only create the metamaterial for the particular waves it will act upon, but also to balance factors such as bandwidth, absorption, transmission, losses, etc.

2. Alternative Installations into Optical Fiber

In the case of a set of resonators (e.g. see Figures and references discussed above), the particular construction and implementation can vary.

The Figures illustrate several envisioned forms for the way the metamaterial dispersion compensation is installed in a fiber optic. The metamaterial comprises a device operably connected in the path of the EM waves being processed. Some type of appropriate interface to channel the waves into the metamaterial device is used. The output of the metamaterial device can be connected to the communication line (in this case shown as connected to an optical receiver). But as previously noted, the metamaterial device can be placed in other positions in or along the fiber optic.

The metamaterial device can include plural sheets serially positioned (and decoupled from one another) along the path of propagation of the EM waves. The incident light would pass through the sheets and be affected by the resonator sets as discussed in the references cited above.

The designer would select the materials, arrangement, number of sheets and carrier body according to a balancing of relevant factors for this application. For example, the sheets can be densely packed and the resonator sets can be metallic nanostructures. They can be impedance matched, one for the E field and one for the M field, to eliminate reflection.

3. Implementation Options

As indicated previously, the invention is not necessarily limited to optical fibers. Other propagation mediums are possible. The example of a hollow waveguide (e.g. aluminum, copper, silver, or other) could have an aperture along the propagation path of the waves. A resonator set, or array of resonator sets, fabricated on a substrate of a size that installs into the opening can be the dispersion compensation device. But other mediums (wired connections, free space, etc.) may be possible.

Another possible implementation is to use dark bound states of a thin dielectric slab to implement the dark mode and a simple surface scatterer (cut-wire, cut-wire pair, SRR, etc.) as bright mode to implement the coupled resonator system. An example for such a system is given in PRL 112, 117403 (2014), incorporated by reference herein.

A solid waveguide (e.g. block of dielectric material) could be fabricated as follows. The block is cut. A resonator set (or array of the same) could be installed on the face of one cut section of the block. The set (or array) would therefore be normal to the direction of propagation through the waveguide. The other section of the cut block could then be spliced to the cut section with the resonator(s) to reestablish the optical path. Two sections of fiber could be cut, the 2D resonator could be installed on the transverse cut face of one section, and the two sections could then be glued or fused back together.

Of course, multiple "sheets" of resonators could be placed at the splice or there could be several splices along the waveguide with added resonators.

Again, the designer would balance competing factors when selecting the exact nature of the resonators, their number, etc.

What is claimed is:

1. A system for managing dispersion of optical pulses that travel through a dispersive medium comprising:
    a) said dispersive medium having a length and a dispersion characteristic;
    b) a dispersion compensative device operatively connected to or along the length of the dispersive medium, the device comprising:
        i) a metamaterial providing dispersion to the optical pulse which fully or partially cancels the dispersion of the pulse caused by the dispersion characteristic of the dispersive medium; the metamaterial engineered to have minimum absorption but maximum transmission for a given set of parameters and comprising:
            (1) a plurality of sheets or substrates separated by very thin Insulating layers each sheet comprising: a plurality of electric and magnetic resonators each having an electric and magnetic response which are generally equal; and
            2) wherein each response system (E and M) comprises two or more coupled resonators at nearly the same resonance frequency but differing coupling strength.

2. The system of claim 1 wherein the metamaterial comprises one or more artificial structures smaller than the wavelengths associated with the frequency characteristic of the optical pulses, the artificial structures affecting the optical pulses in an analogous way to electromagnetically induced transparency (EIT) correlated to the frequency characteristic of the pulse to use the spectral response of EIT for dispersion compensation.

3. The system of claim 2 wherein the metamaterial comprises a plurality of two or more coupled interacting resonators that asymmetrically couple to the mode in the dispersive medium.

4. The system of claim 3 wherein the plurality of two or more coupled interacting resonators are distributed in the metamaterial.

5. The system of claim 4 wherein:
 a) the dispersive medium comprises a fiber optic adapted to carry optical pulses in the infrared (IR) frequency range; and
 b) each artificial sub-wavelength size structure comprising:
  i) two or more coupled interacting resonators that asymmetrically couple to the mode in the dispersive medium for strong dispersion.

6. The system of claim 5 wherein the metamaterial comprises a form factor of relatively small volume.

7. The system of claim 6 wherein the metamaterial is implemented in a wave guide that is operatively connected to the fiber optic, the wave guide comprising:
 a) an input for receiving the optical pulses;
 b) an output; and
 c) a body between input and output containing the one or more sets of coupled interacting resonators.

8. The system of claim 7 wherein each set of coupled interacting resonators is isolated from any other set to deter interaction between sets of coupled resonators.

9. The system of claim 1 wherein the metamaterial is modeled after a sheet of artificial structures:
 a) transverse to the direction of propagation of the optical pulses through the metamaterial;
 b) in either a periodic or non-periodic arrangement on the sheet;
 c) tuned to the frequency characteristic of the optical pulses; and
 d) the device can comprise one or more separated sheets aligned with the direction of propagation of the optical pulses.

10. The system of claim 9, wherein the number of sheets is correlated to a balancing of:
 a) length of the optical fiber:
 b) desired bandwidth;
 c) form factor of device (including size and amount of space the device occupies)
 d) strength of dispersion at localized area;
 e) amount of loss.

11. A method of counteracting group velocity dispersion of electromagnetic pulses in a dispersive medium comprising:
 a) inserting along the dispersive medium a metamaterial comprising strongly dispersive meta atoms of a sign opposite to the dispersion of the pulses by the dispersive medium,
 b) the metamaterial engineered to have minimum absorption but maximum transmission for a give set of parameters and comprising:
  (1) a plurality of sheets or substrates separated by very thin Insulating layers each sheet comprising: a plurality of electric and magnetic resonators each having an electric and magnetic response which are generally equal; and
  2) wherein each response system (E and M) comprises two or more coupled resonators at nearly the same resonance frequency but differing coupling strength.

* * * * *